(12) United States Patent
Takaki

(10) Patent No.: US 10,705,186 B2
(45) Date of Patent: Jul. 7, 2020

(54) APPARATUS FOR DETECTING AXIAL MISALIGNMENT

(71) Applicant: DENSO CORPORATION, Kariya, Aichi-pref. (JP)

(72) Inventor: Ryo Takaki, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 468 days.

(21) Appl. No.: 15/506,677

(22) PCT Filed: Aug. 27, 2015

(86) PCT No.: PCT/JP2015/074250
§ 371 (c)(1),
(2) Date: Feb. 24, 2017

(87) PCT Pub. No.: WO2016/031919
PCT Pub. Date: Mar. 3, 2016

(65) Prior Publication Data
US 2017/0261601 A1 Sep. 14, 2017

(30) Foreign Application Priority Data
Aug. 27, 2014 (JP) .................. 2014-173075
Feb. 10, 2015 (JP) .................. 2015-024521

(51) Int. Cl.
*G01S 7/40* (2006.01)
*G01S 13/93* (2020.01)
(Continued)

(52) U.S. Cl.
CPC .............. *G01S 7/4026* (2013.01); *G01S 7/40* (2013.01); *G01S 13/867* (2013.01); *G01S 13/93* (2013.01);
(Continued)

(58) Field of Classification Search
CPC ........ G01S 7/4026; G01S 7/40; G01S 13/867; G01S 13/93; G01S 13/931; G01S 13/86;
(Continued)

(56) References Cited

U.S. PATENT DOCUMENTS 9,360,555 B2 * 6/2016 Oh ..................... G01S 17/931
10,126,410 B2 * 11/2018 Treptow ............... G01S 13/931
(Continued)

FOREIGN PATENT DOCUMENTS

JP 2002-174684 6/2002
JP 2002-174684 A 6/2002
(Continued)

*Primary Examiner* — Vladimir Magloire
*Assistant Examiner* — Michael W Justice
(74) *Attorney, Agent, or Firm* — Maschoff Brennan

(57) ABSTRACT

In a diagnostic apparatus, a diagnostic unit diagnoses whether there is vertical misalignment. The vertical misalignment is misalignment of the probing beam with respect to a designed beam axis position in a vertical direction, i.e. a height direction, of the vehicle. Based on detection performance information representing whether target detection performance by the beam sensor is likely to be lower than a predetermined detection performance, a determining unit causes the diagnostic unit to execute diagnosis of the vertical misalignment upon the detection performance information representing, as a first detection state, that the detection performance is not likely to be lower than the predetermined detection performance. The determining unit disables the diagnostic unit from executing diagnosis of the vertical misalignment upon the detection performance information representing, as a second detection state, that the detection performance is likely to be lower than the predetermined detection performance.

14 Claims, 19 Drawing Sheets

(51) Int. Cl.
*G01S 13/86* (2006.01)
*G01S 13/931* (2020.01)

(52) U.S. Cl.
CPC ............. *G01S 13/931* (2013.01); *G01S 13/86* (2013.01); *G01S 2007/4034* (2013.01); *G01S 2013/932* (2020.01)

(58) Field of Classification Search
CPC ..... G01S 2007/4034; G01S 2007/9353; G01S 7/497; G01S 7/4972; G01S 7/5205
USPC .................................................. 342/52, 174
See application file for complete search history.

(56) References Cited

U.S. PATENT DOCUMENTS

| | | | |
|---|---|---|---|
| 10,353,050 B2* | 7/2019 | Nakatani | G01S 13/931 |
| 2006/0103927 A1 | 5/2006 | Samukawa et al. | |
| 2006/0132753 A1* | 6/2006 | Nichols | G01S 13/865 |
| | | | 356/5.07 |
| 2007/0055446 A1* | 3/2007 | Schiffmann | G01S 7/4026 |
| | | | 701/301 |
| 2009/0292468 A1* | 11/2009 | Wu | G01S 13/726 |
| | | | 701/301 |
| 2009/0312906 A1* | 12/2009 | Bauer | B60W 40/04 |
| | | | 701/36 |
| 2012/0235851 A1* | 9/2012 | Park | G01S 13/931 |
| | | | 342/70 |
| 2013/0015999 A1* | 1/2013 | Alland | G01S 13/931 |
| | | | 342/70 |
| 2013/0335569 A1* | 12/2013 | Einecke | G01S 13/867 |
| | | | 348/148 |
| 2014/0333468 A1* | 11/2014 | Zhu | G01S 17/95 |
| | | | 342/54 |
| 2016/0054442 A1* | 2/2016 | Li | G01S 13/931 |
| | | | 342/27 |
| 2016/0349356 A1 | 12/2016 | Takaki | |

FOREIGN PATENT DOCUMENTS

| | | | | |
|---|---|---|---|---|
| JP | 2008-215912 | | 9/2008 | |
| JP | 2008-215912 A | | 9/2008 | |
| JP | 2009-085920 | | 4/2009 | |
| TW | 103128709 | * | 8/2014 | ........... G01S 13/931 |

* cited by examiner (a) PREDETERMINED POSITION IN HORIZONTAL DIRECTION (b) PREDETERMINED POSITION IN VERTICAL DIRECTION (c) MISALIGNMENT IN VERTICAL DIRECTION

DISTANCE DETERMINATION

| [INPUT] DISTANCE [m] | [OUTPUT] DISTANCE INDEX |
|---|---|
| 0-10m | 1 |
| 10-20m | 2 |
| 20-30m | 3 |
| 30-40m | 4 |
| 40-50m | 5 |
| 50-60m | 6 |
| 60-70m | 7 |
| 70-80m | 8 |
| 80-90m | 9 |
| 90-100m | 10 |
| 100m- | 11 |

| INPUT 1 | TARGET PAIR-RECOGNITION PERCENTAGE | X% |
|---|---|---|
| INPUT 2 | ABNORMAL-RECOGNITION PERCENTAGE | Y% |
| OUTPUT | VERTICAL MISALIGNMENT ESTIMATION | $-\alpha$ deg |

DISTANCE DETERMINATION

| [INPUT] DISTANCE [m] | [OUTPUT] DISTANCE INDEX |
|---|---|
| 0-10m | 1 |
| 10-20m | 2 |
| 20-30m | 3 |
| 30-40m | 4 |
| 40-50m | 5 |
| 50-60m | 6 |
| 60-70m | 7 |
| 70-80m | 8 |
| 80-90m | 9 |
| 90-100m | 10 |
| 100m- | 11 |

APPARATUS FOR DETECTING AXIAL MISALIGNMENT

TECHNICAL FIELD

The present invention relates to technologies for detecting axial misalignment of a beam sensor installable to vehicles. Note that the axial misalignment of a beam sensor represents displacement of a reference axis of a beam output from the beam sensor in its travelling direction with respect to a previously designed axis position; the reference axis of a beam sensor is referred to as a beam axis of the beam sensor.

BACKGROUND ART

Beam sensors are usually used to perform various types of control for improving the running safety of vehicles. Such a beam sensor transmits probing beams, such as laser beams, ultrasonic waves, or millimeter waves, and receives reflected beams, thus detecting targets located around a vehicle.

Such a beam sensor is mounted to a predetermined mount position of a vehicle while the beam axis is aligned with a previously designed axis position such that each probing beam is irradiated within a predetermined irradiation range. For this reason, if any factor causes the mounted position of the beam sensor to be deviated from the predetermined mount position, the beam axis may be deviated from the previously designed axis position. This may result in radar waves being out of the predetermined irradiation range. This may deteriorate the detection accuracy of targets to be detected by the beam sensor, deteriorating the accuracy of the various types of control for improving the running safety of the vehicle.

Note that such axial misalignment of the beam axis relative to a previously designed axis position will also be referred to merely as axial misalignment. In addition, axial misalignment in a vertical plane including the beam axis will be referred to as vertical misalignment, and axial misalignment in a horizontal plane including the beam axis will also be referred to as horizontal misalignment.

In view of these circumstances, technologies are proposed for detecting axial misalignment of beam sensors.

For example, a technology disclosed in patent document 1 detects a vanishing point in accordance with an image captured while a vehicle to which a laser beam sensor is installed is running.

Then, during adjustment of the laser beam axis, i.e. while the vehicle is stopped, the technology detects, based on the detected vanishing point and the transmitting direction of a laser beam, the difference between the transmitting direction of the laser beam and the forward direction of the vehicle, and corrects the transmitting direction of the laser beam accordingly.

CITATION LIST

Patent Document

[Patent Document 1] Japanese Patent Application Publication No. 2004-205398

SUMMARY OF INVENTION

Technical Problem

The technology disclosed in patent document 1 is capable of correcting the transmission direction of the laser beam in accordance with the vanishing point that is detected based on the image captured while the vehicle to which the laser beam sensor is installed is running. Unfortunately, the technology performs the correction of the transmitting direction of the laser beam during adjustment of the laser beam axis, i.e. while the vehicle is stopped. Thus, the technology may result in a difficulty in detection of axial misalignment of the radar beam sensor while the corresponding vehicle is running.

The present invention has been created in view of such a problem. For example, a first object of the present invention is to provide technologies, each of which is capable of detecting axial misalignment of a beam sensor, which is installable to a vehicle, while the vehicle is running.

In addition, a second object of the present invention is to improve the accuracy of detecting axial misalignment of the beam axis of a beam sensor installable to vehicles.

Means for Solving Problem

A first aspect of the present invention includes a diagnostic apparatus of a beam sensor (11) installed in a vehicle. The beam sensor transmits a probing beam and receives a reflected beam based on the probing beam to detect a target. The diagnostic apparatus includes a diagnostic unit (13d, S300) for diagnosing whether there is vertical misalignment. The vertical misalignment is misalignment of the probing beam with respect to a designed beam axis position in a vertical direction, the vertical direction corresponding to a height direction of the vehicle. The diagnostic apparatus includes a determining unit (13c, S200) configured, based on detection performance information representing whether there is a possibility that detection performance of a target by the beam sensor is lower than a predetermined detection performance, to (A) Cause the diagnostic unit to execute diagnosis of the vertical misalignment upon the detection performance information representing, as a first detection state, that there is no possibility that the detection performance of the target by the beam sensor is lower than the predetermined detection performance (B) Disable the diagnostic unit from executing diagnosis of the vertical misalignment upon the detection performance information representing, as a second detection state, that there is a possibility that the detection performance of the target by the beam sensor is lower than the predetermined detection performance.

The second aspect of the present invention is configured to disable execution of diagnosis of the vertical misalignment when it is determined that there is a possibility that the detection performance of the target by the beam sensor is lowered. This configuration prevents the state where there is a possibility that the detection performance of the target by the beam sensor is lowered from being erroneously detected as the state where there is vertical misalignment that is misalignment of the probing beam with respect to the designed beam axis position in the vertical direction. That is, this configuration reduces erroneous detection of vertical misalignment of the beam axis of the beam sensor.

A second first aspect of the present invention is a diagnostic apparatus of a beam sensor (11) installed in a vehicle. The beam sensor transmits a probing beam and receives a reflected beam based on the probing beam to detect a target. The diagnostic apparatus includes a diagnostic unit (13d, S300) for (1) Diagnosing whether there is vertical misalignment, the vertical misalignment being misalignment of the probing beam with respect to a designed beam axis position in a vertical direction, the vertical direction corresponding to a height direction of the vehicle (2) Obtaining a quantity of the vertical misalignment when it is determined that there is the vertical misalignment.

The diagnostic apparatus includes an obtaining unit for obtaining detection performance information representing whether there is a possibility that detection performance of a target by the beam sensor is lower than a predetermined detection performance. The diagnostic apparatus includes a correcting unit for correcting the quantity of the vertical misalignment obtained by the diagnostic unit such that a value of the quantity of the vertical misalignment, when the detection performance information indicates that there is a possibility that the detection performance of the target by the beam sensor is lower than the predetermined detection performance, is less than a value of the quantity of the vertical misalignment, when the detection performance information represents that there is no possibility that the detection performance of the target by the beam sensor is lower than the predetermined detection performance.

The second aspect of the present invention corrects the quantity of the vertical misalignment such that a value of the quantity of the vertical misalignment, when the detection performance information indicates that there is a possibility that the detection performance is lower than the predetermined detection performance, is less than a value of the quantity of the vertical misalignment, when the detection performance information represents that there is no possibility that the detection performance is lower than the predetermined detection performance.

This correction enables the vertical misalignment quantity of the beam sensor to be obtained as a proper value depending on the lowering of the detection performance.

Note that bracketed reference numerals in the claims represent correspondence relationship with respect to specific means described in the following embodiments as an example, and therefore do not restrict the scope of the present invention.

DESCRIPTION OF EMBODIMENTS

The following describes the embodiments of the present invention with reference to the accompanying drawings.

1. First Embodiment

1-1. Structure

Figure 1:
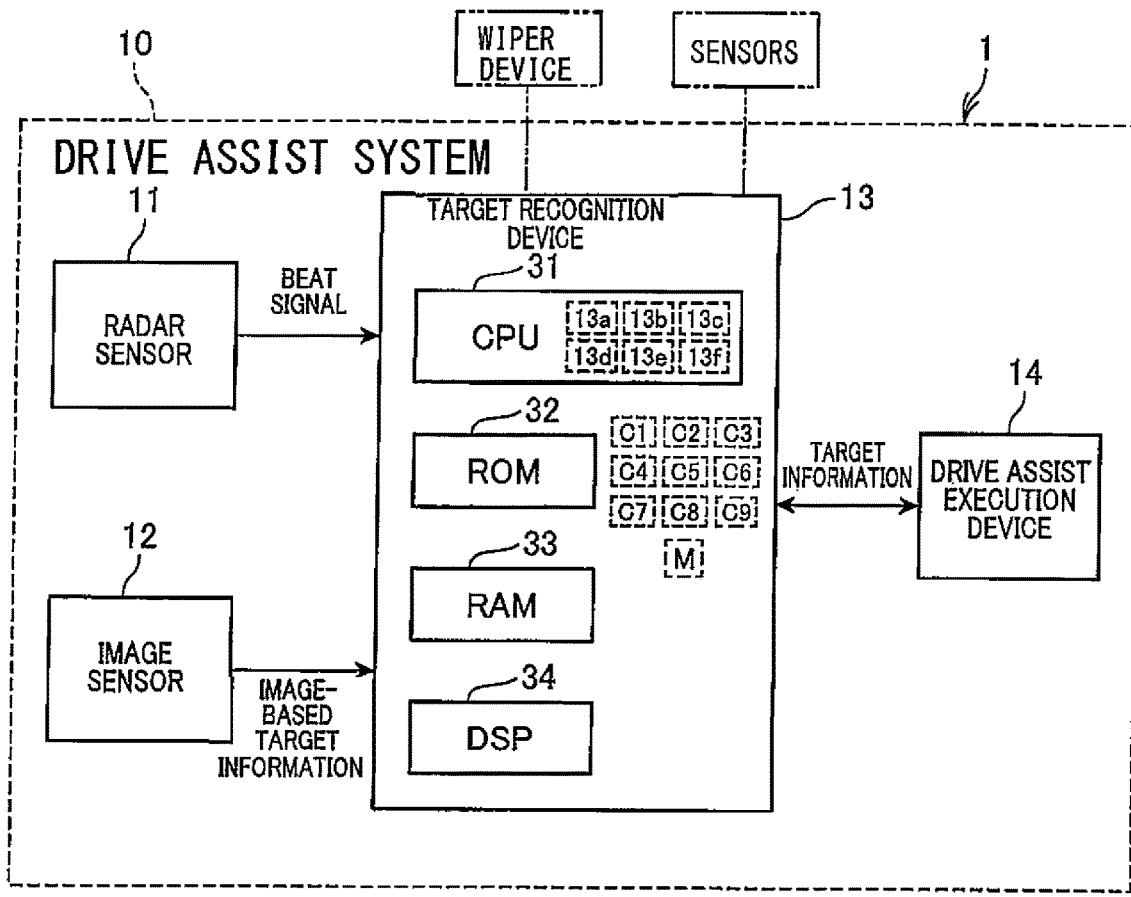
FIG. 1 is a block diagram illustrating an example of the structure of a drive assist system and a target recognition device according to the first embodiment of the present invention.

Referring to FIG. 1, a drive assist system 10 according to the first embodiment includes a radar sensor 11, an image sensor 12, a target recognition device 13, and a drive-assist execution device 14. The drive assist system 10 is installed in a vehicle 1.

The target recognition device 13 is communicably connected to the radar sensor 11, the image sensor 12, and the drive-assist execution device 14.

The radar sensor 11 irradiates radar waves, i.e. radar beams, toward a first probing region established in front of the own vehicle 1, and receives echoes, i.e. reflected beams, based on the irradiated radar beams. For example, the radar sensor 11 and the target recognition device 13 constitute a known Frequency Modulated Continuous Wave (FMCW) radar that detects targets within the first probing region using millimeter waves.

Figure 2:
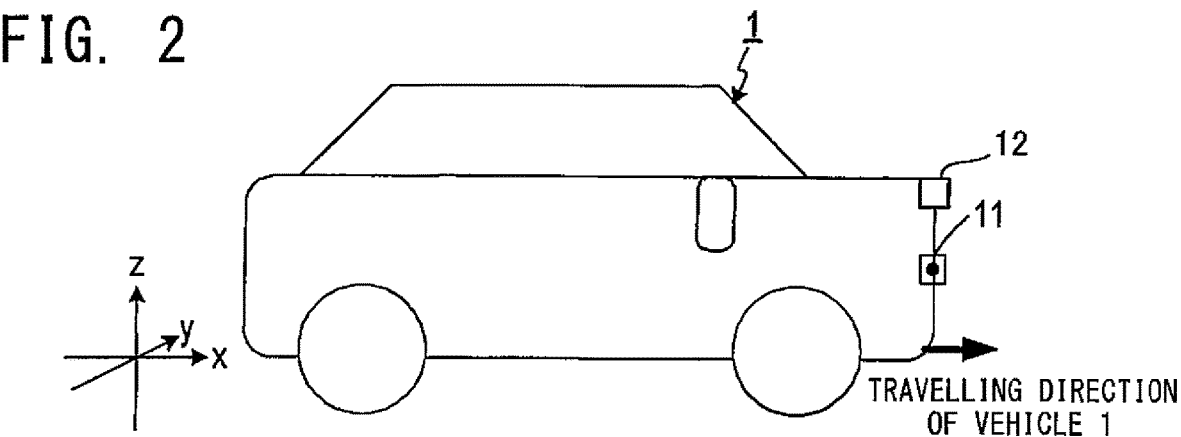
FIG. 2 is a view illustrating where a radar sensor illustrated in FIG. 1 is mounted to a vehicle.

Referring to FIG. 2, the radar sensor 11 is mounted to a predetermined position of the front end of the own vehicle 1. Specifically, the radar sensor 11 is mounted such that the center axis, i.e. radar axis, of its detection range has a predetermined angle with respect to each of the front-rear direction and the vertical direction of the own vehicle 1. The front-rear direction is the longitudinal direction of the own vehicle 1 corresponding to the X direction in FIG. 2, and the vertical direction is the vehicle height direction corresponding to the Z direction in FIG. 2; the vertical direction is perpendicular to the X direction and a Y direction corresponding to the vehicle width direction illustrated in FIG. 2.

Figure 3:
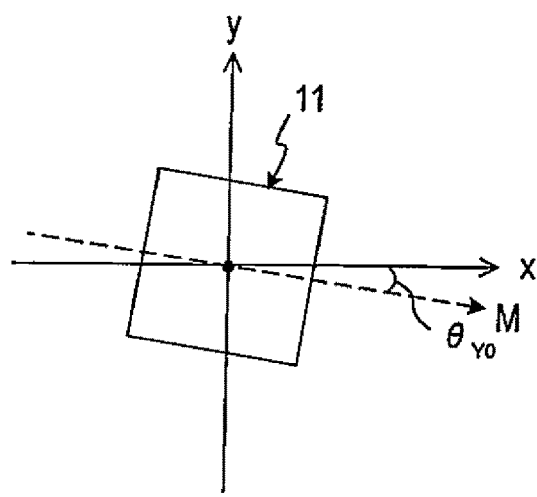
FIG. 3 is an explanatory view for describing misalignment of the radar sensor illustrated in FIG. 1 in a horizontal direction, and misalignment of the radar sensor in a vertical direction.
Figure 3:
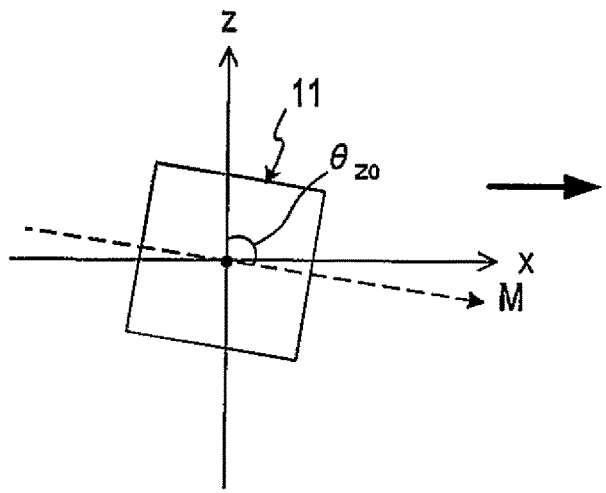
Figure 3:
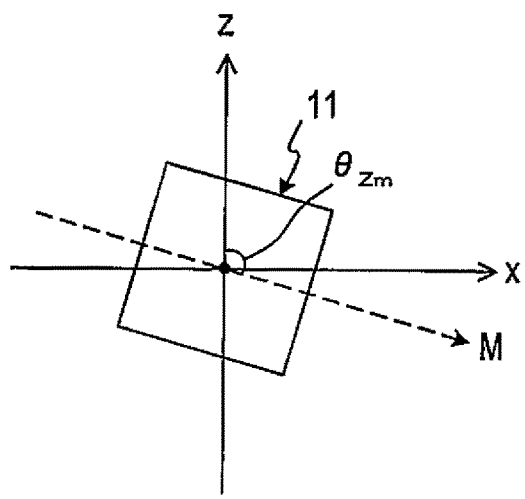

Reference characters (a) and (c) of FIG. 3 illustrate an example of the mount structure. Specifically, the radar sensor 11 is mounted such that (1) The center axis M of the detection range has a predetermined angle $\theta_{Y0}$ relative to a predetermined direction, for example, the direction of the X-axis, in the vehicle width direction along the X-Y plane, i.e. a horizontal plane, of the own vehicle (2) The radar sensor 11 is mounted such that the center axis M of the detection range has a predetermined angle $\theta_{Z0}$ relative to a predetermined direction, for example, the direction of the Z-axis, in the vehicle width direction along the X-Z plane, i.e. a vertical plane, of the own vehicle.

Hereinafter, the following state in which the angle, referred to as $\theta_{Ym}$, formed between the center axis M of the detection range and the predetermined direction, i.e. the X axis, in the vehicle width direction along the X-Y plane deviates from the predetermined angle $\theta_{Y0}$ is referred to as a state in which axial misalignment in the horizontal direction has occurred.

Similarly, the following state in which the angle, referred to as $\theta_{Zm}$, formed between the center axis M of the probing range and the predetermined direction, i.e. the Z axis, in the vehicle height direction along the Z-X plane deviates from the predetermined angle $\theta_{Z0}$ is referred to as a state in which axial misalignment in the vertical direction has occurred (see reference character (c) in FIG. 3 as an example).

Specifically, as illustrated in FIG. 2, the radar sensor 11 is disposed to, for example, the center of the front of the vehicle 1. The radar sensor 11 transmits, toward the first probing range via a transmitting antenna, a transmitting wave, i.e. a transmitting beam, whose frequency linearly rises, i.e. is modulated upward, and linearly falls, i.e. is modulated downward. The radar sensor 11 receives, via a receiving antenna, radar waves, i.e. reflection beams, reflected by a target in front of the radar sensor 11. Then, the radar sensor 11 mixes the transmitting beam with each of the received beams to thereby extract a beat signal having a beat frequency matching with the distance R and relative velocity V between the radar sensor 11 and the target.

For example, at least one of the transmitting antenna and the receiving antenna of the radar sensor 11 is comprised of an array of antennas. Note that the combination of the transmitting antenna and the receiving antenna, at least one of which is comprised of the array of antennas, will be referred to as channels. The radar sensor 11 is operative to extract a beat signal for each of the channels. The radar sensor 11 causes an AD converter to convert the extracted analog beat signal to a digital beat signal, and outputs the digital beat signal to the target recognition device 13. The output beat signals are input to the target recognition device 13.

Referring to FIG. 2, the image sensor 12 is comprised of, for example, a CCD camera disposed to, for example, the front of the vehicle 1 and located above the radar sensor 11. The CCD camera captures images in a second probing region established around the own vehicle 1, i.e. established in front of the own vehicle 1 according to the first embodiment.

Figure 4:
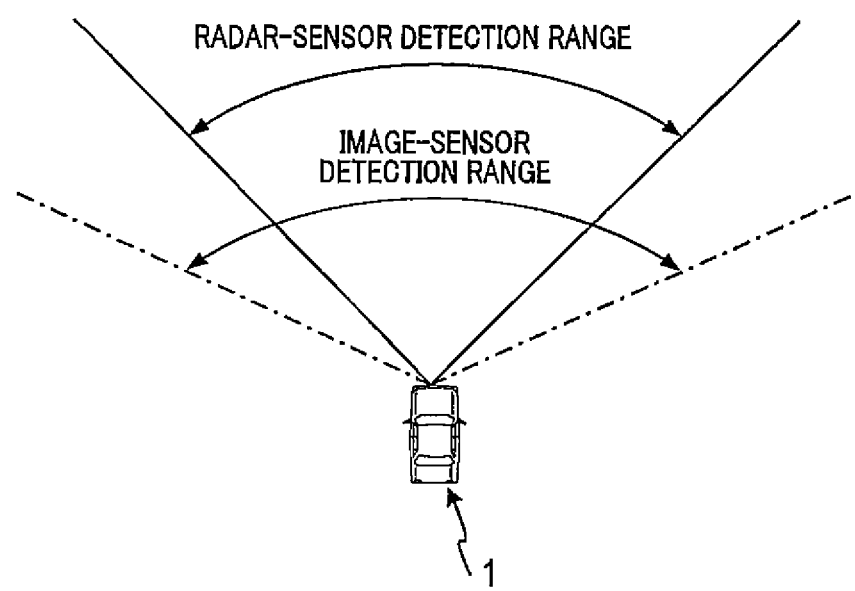
FIG. 4 is an explanatory view for describing the detection ranges of the respective radar sensor and image sensor illustrated in FIG. 1.

The detecting range of the CCD camera has a predetermined angular range wider than that of the detection range of the radar sensor 11 (see FIG. 4).

Specifically, as illustrated in FIG. 4, the first probing range, i.e. first detection region, of the radar sensor 11 is a region expanding, in the form of a sector shape, to have a predetermined angle of view in the horizontal direction, i.e. the vehicle width direction of the vehicle 1, while centering on the beam axis of the radar beam.

Additionally, the second probing range, i.e. second detection region, of the image sensor 12 is a region expanding, in the form of a sector shape, to have a predetermined angle of view in the horizontal direction, i.e. the vehicle width direction, while centering on the optical axis of the image sensor 12. Note that, as illustrated in FIG. 4, the beam axis of the radar sensor 11 is in agreement with the optical axis of the image sensor 12 when viewed from above the vehicle 1 as illustrated in FIG. 4.

Figure 12:
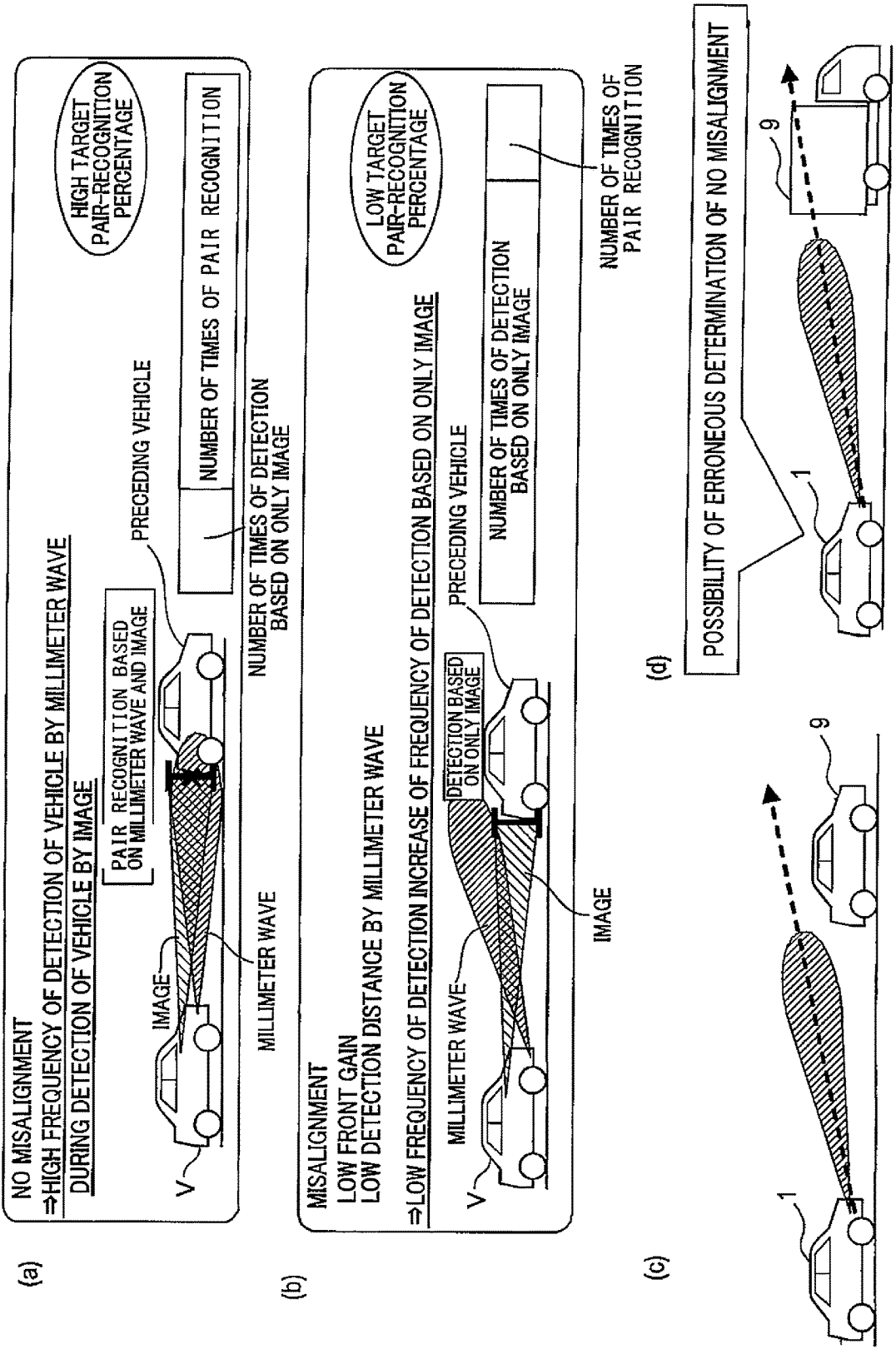
FIG. 12 is a diagram illustrating advantageous effects of the vertical misalignment diagnostic routine according to the first embodiment, and illustrating a detection count routine according to the third embodiment.

In addition, the first probing region, i.e. first detection region, of the radar sensor 11 expands, in the form of a sector shape, to have a predetermined angle of view in the vertical direction, i.e. the height direction of the vehicle 1, while centering on the beam axis of the radar beam. Additionally, the second probing region, i.e. second detection region, of the image sensor 12 expands, in the form of a sector shape, to have a predetermined angle of view in the vertical direction, i.e. the height direction, while centering on the optical axis of the image sensor 12 (see (a) of FIG. 12).

This results in the first probing region and the second probing region being at least partly overlap one another.

The image sensor 12 performs known image-processing tasks, such as template matching, with respect to image data captured by the CCD camera, thus detecting predetermined targets, such as vehicles or pedestrians, located in the corresponding detection range.

The image sensor 12 also transmits, to the target recognition device 13, information indicative of at least one target, which is referred to as an image-based target, detected by the image-processing tasks as image-based target information. The image-based target information includes at least the type, size, position, such as distance and orientation, of the image-based target.

The target recognition device 13 is comprised of a microcomputer including, for example, a CPU 31, a ROM 32, and a RAM 33. The target recognition device 13 also includes a digital signal processor (DSP) 34 for executing signal processing, such as fast Fourier transform (FFT).

The CPU 31 of the target recognition device 13 serves as a beam recognition unit 13a for recognizing, in accordance with the beat signal(s) obtained from the radar sensor 11, one or more targets located within the first probing region, thus generating target information to be supplied to the drive assist execution device 14 accordingly.

The CPU 31 of the target recognition device 13 also serves as an image recognition unit 13b for recognizing, in accordance with the image-based target information obtained from the image sensor 12, one or more targets located within the second probing region, thus generating target information to be supplied to the drive assist execution device 14 accordingly. Detailed descriptions of how to recognize one or more targets based on the above target recognition operations are omitted, because how to recognize one or more targets based on the above target recognition operations is a well-known technology.

Figure 5A:
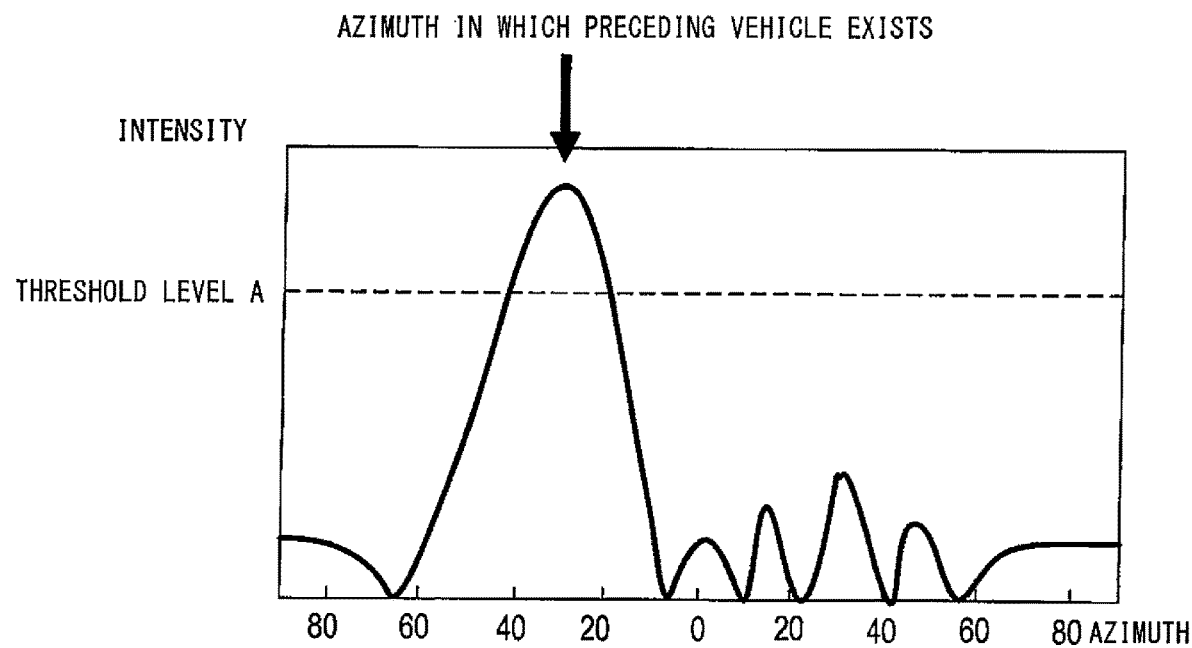
FIG. 5A is a graph illustrating an example of the intensity distribution of reflected beams obtained by a beam recognition unit illustrated in FIG. 1 while the detection performance of the radar sensor illustrated in FIG. 1 remains without falling.

As illustrated in FIG. 5A as an example, the beam recognition unit 13a calculates an intensity distribution of the received reflection beams within the first probing region in accordance with the beat signals obtained from the radar sensor 11. Then, the beam recognition unit 13a recognizes the azimuth orientation of a corresponding predetermined target when the intensity of the corresponding reflection beam is equal to or higher than a predetermined threshold level A. Note that the beam recognition unit 13a according to the first embodiment recognizes a preceding vehicle that is travelling in front of the own vehicle 1 as the predetermined target.

Detailed descriptions of how to recognize one or more targets based on the above target recognition operations are omitted, because how to recognize one or more targets based on the above target recognition operations is a wall-known technology.

Figure 5B:
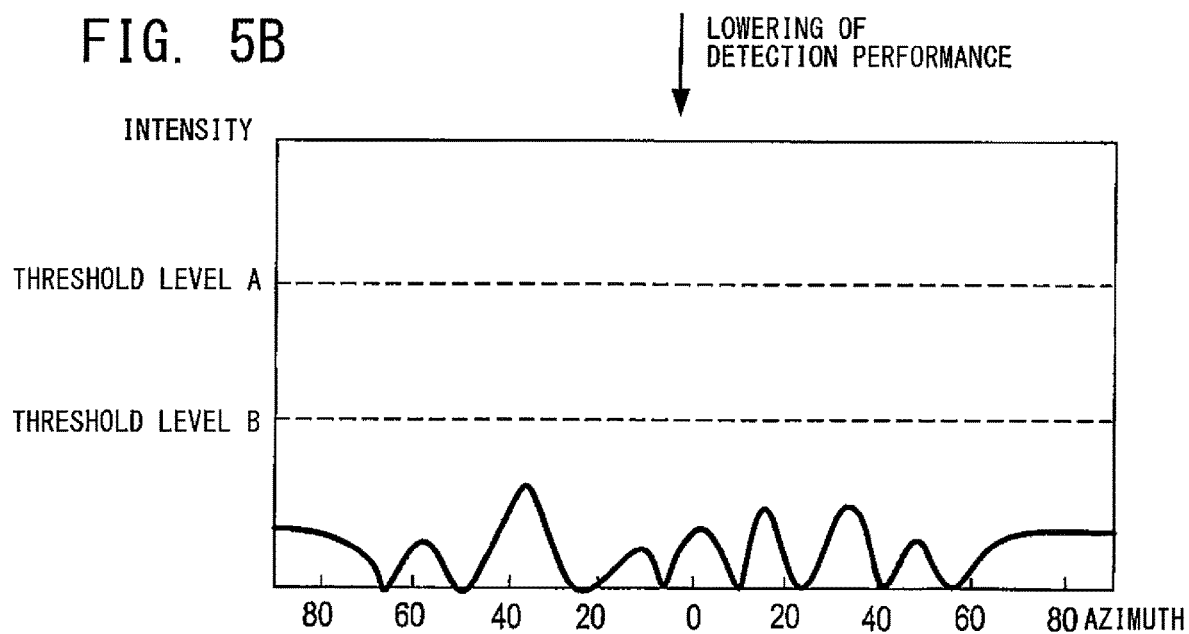
FIG. 5B is a graph illustrating an example of the intensity distribution of reflected beams obtained by the beam recognition unit illustrated in FIG. 1 while the detection performance of the radar sensor illustrated in FIG. 1 has fallen.

The target recognition device 13 includes a determination unit 13c that determines whether there is a possibility that the target detection performance of the radar sensor 11 is lower than predetermined target detection performance, and outputs the result of the determination as detection performance information. For example, if dirt adheres to the front of the radar sensor 11, i.e. to the portion of the radar sensor 11 from which radar waves are irradiated, the detection performance of the radar sensor 11 may be reduced as compared with no dirt adhering to the front of the radar sensor 11. In this case, as illustrated in FIG. 5B as an example, the intensities of the received reflection beams may be reduced.

This may result in the intensity of the received reflection beam of an azimuth orientation being lower than the threshold level A although the intensity of the received reflection beam of the corresponding azimuth orientation is equal to or higher than the threshold level A when there is no dirt adhering to the front of the radar sensor 11. Specifically, this may result in preceding vehicles being not detected.

In addition to the case where dirt adheres to the front of the radar sensor 11, the intensities of the received reflection beams may be reduced so that preceding vehicles may not be detected if it rains or snows, if there is a cloud of dust, or another situation.

For example, the determiner 13c of the target recognition device 13 is configured to (1) Output detection performance information representing that there is a possibility that the detection performance of the radar sensor 11 has fallen when the intensities of the received reflection beams within the entire of the first probing region, i.e. the entire of the detection range, are less than a predetermined threshold level B lower than the threshold level A (2) Output detection performance information representing that there is no possibility that the detection performance of the radar sensor 11 has fallen when the intensities of the received radio waves within the entire of the detection range are equal to or higher than the predetermined threshold level B.

The CPU 13 of the target recognition device 31 serves as a diagnosis processor for performing a radar misalignment diagnostic task that determines whether there is axial misalignment in the radar sensor 11.

The drive-assist execution device 14 controls various in-vehicle devices in accordance with the recognition results, i.e. target information, obtained by the target recognition device 13 to perform predetermined drive assist accordingly. The drive-assist execution device 14 includes at least a monitor and/or a speaker as the in-vehicle devices that the drive-assist execution device 14 controls. The monitor is operative to display various images, and the speaker is operative to output audible alarms and guide messages. The drive-assist execution device 14 can include various control units for controlling an internal combustion engine, a powertrain mechanism, and a brake mechanism installed in the own vehicle 1.

1-2. Routine 1-2-1. Radar Misalignment Diagnostic Routine

Figure 6:
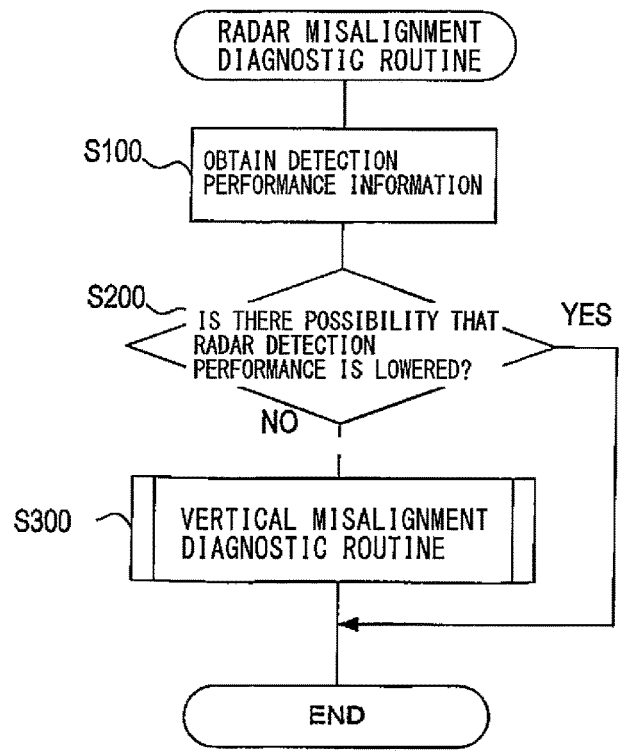
FIG. 6 is a flowchart schematically illustrating a radar misalignment diagnostic routine according to the first embodiment of the present invention.

Next, the following describes the radar misalignment diagnostic routine carried out by the target recognition device 13, i.e. its CPU 13, with reference to the flowchart of FIG. 6.

For example, the target recognition device 13 repeatedly executes the radar misalignment diagnostic routine while cruise control is carried out by the drive-assist execution device 14 based on the recognition results, i.e. target information, obtained by the target recognition device 13 with an auto cruise switch (ACC) switch on. The cruise control is control that automatically controls the speed of the own vehicle 1 as a function of the distance between the own vehicle 1 and a preceding vehicle.

First, the target recognition device 13 obtains the detection performance information in step S100. Note that the operation in step S100 by the CPU 31 or a hardware structure that carries out the operation in step S100 serves as, for example, information obtaining means.

Next, the target recognition device 13 determines whether there is a possibility that the target detection performance of the radar sensor 11 is lower than predetermined detection performance in step S200.

The target recognition device 13 determines that there is a possibility that the target detection performance of the radar sensor 11 is lower than the predetermined detection performance upon determining that the detection performance information obtained in step S100 represents that there is a possibility that the detection performance of the radar sensor 11 has fallen (YES in step S200). Then, the target recognition device 13 disables execution of a vertical misalignment diagnostic routine, terminating the radar misalignment diagnostic routine. Specifically, the target recognition device 13 terminates the radar misalignment diagnostic routine without executing the vertical misalignment diagnostic routine.

Otherwise, the target recognition device 13 executes the vertical misalignment diagnostic routine in step S300 upon determining that the detection performance information obtained in step S100 represents that there is no possibility that the detection performance of the radar sensor 11 has fallen (NO in step S200).

The determining operation in step S200 by the CPU 31 or a hardware structure that carries out the determining operation in step S200 serves as, for example, the determining means 13c.

The diagnostic routine in step S300 by the CPU 31 or a hardware structure that carries out the diagnostic routine in step S300 serves as, for example, a diagnostic means 13d.

The target recognition device 13 terminates the radar misalignment diagnostic routine after executing the vertical misalignment diagnostic routine in step S300.

1-2-2. Vertical Misalignment Diagnostic Routine

Figure 7:
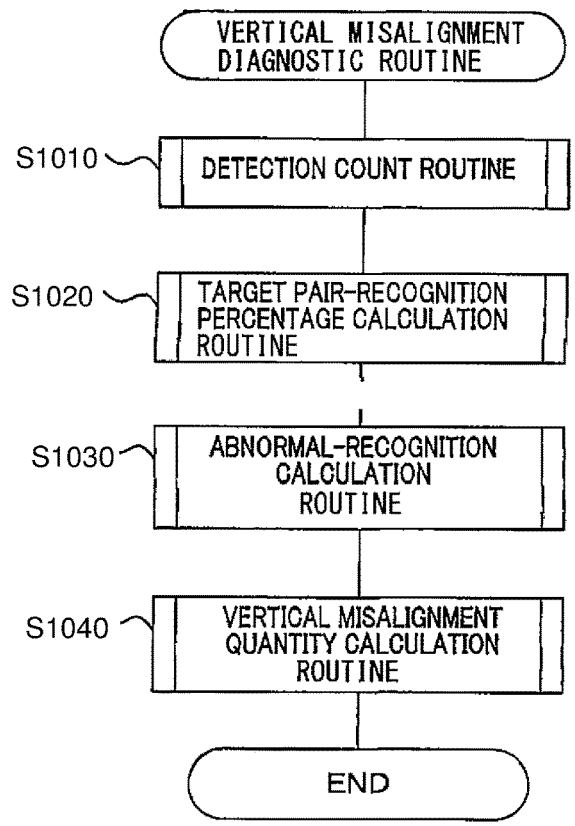
FIG. 7 is a flowchart schematically illustrating a vertical misalignment diagnostic routine in the radar misalignment diagnostic routine illustrated in FIG. 6.

Next, the following describes an example of the vertical misalignment diagnostic routine carried out in step S300 of the radar misalignment diagnostic routine with reference to the flowchart of FIG. 7. Hereinafter, "misalignment" simply described in the vertical misalignment diagnostic routine means "vertical misalignment".

First, in step S1010, the target recognition device 13 executes a detection count routine as a subroutine. The detailed descriptions of the detection count routine will be described later. Thereafter, the vertical misalignment diagnostic routine proceeds to step S1020.

In step S1020, the target recognition device 13 executes a target pair-recognition percentage calculation routine as a subroutine. The detailed descriptions of the target pair-recognition percentage calculation routine will be described later. Thereafter, the vertical misalignment diagnostic routine proceeds to step S1030.

In step S1030, the target recognition device 13 executes an abnormality-recognition percentage calculation routine as a subroutine. The detailed descriptions of the abnormality-recognition percentage calculation routine will be described later. Thereafter, the vertical misalignment diagnostic routine proceeds to step S1040.

In step S1040, the target recognition device 13 executes a vertical misalignment-quantity calculation routine as a subroutine. The detailed descriptions of the vertical misalignment-quantity calculation routine will be described later.

Thereafter, the target recognition device 13 terminates the vertical misalignment diagnostic routine.

1-2-2-1. Detection Count Routine

Figures 8A, 8B:
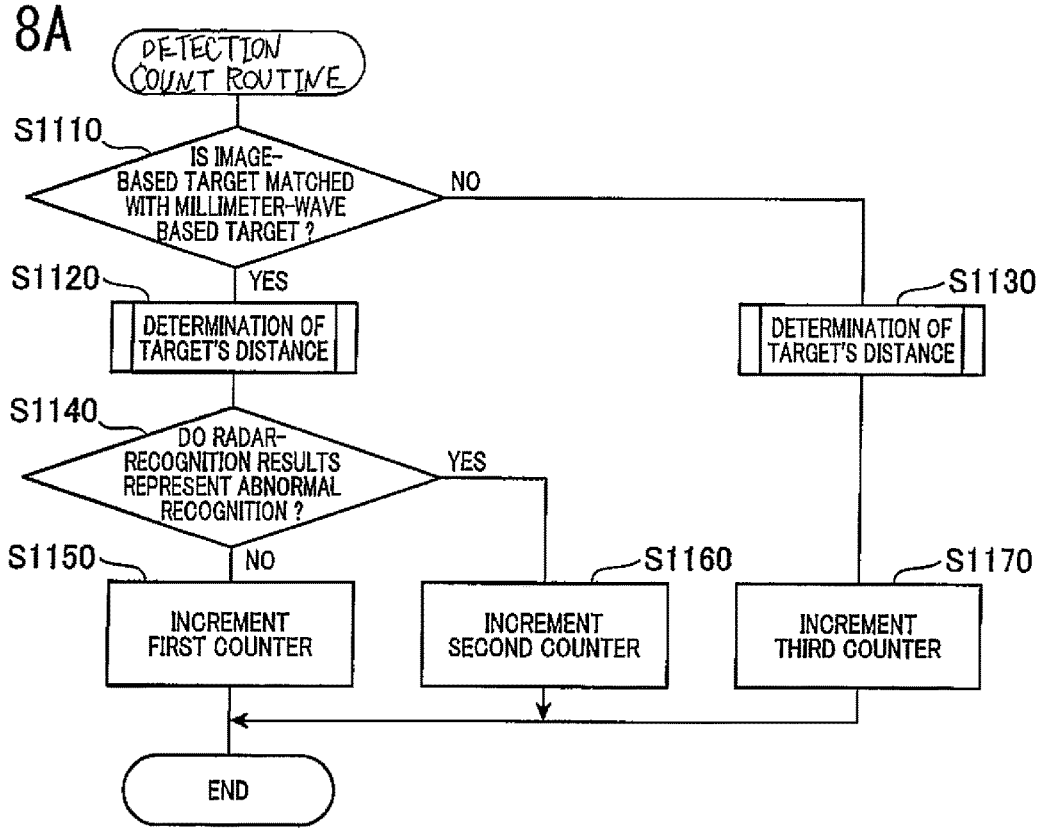
FIG. 8A is a flowchart schematically illustrating a detection count routine in the vertical misalignment diagnostic routine.
FIG. 8B is a diagram illustrating a distance determination table used by the detection count routine.

Next, the following describes the detection count routine as the subroutine of step S1010 in the vertical misalignment diagnostic routine with reference to the flowchart of FIG. 8A.

First, in step S1110, the target recognition device 13 determines whether an image-based target matches with a millimeter-wave based target. Note that, in step S1110, the image-based target is the preceding vehicle 9 recognized by the image sensor 12, and the millimeter-wave based target is the preceding vehicle 9 recognized by the radar sensor 11. The matching of the image-based target and radar-based target means that the same target is recognized by the pair of the radar sensor 11 and the image sensor 12. This recognition therefore means pair recognition. That is, the target recognition device 13 determines whether the same preceding vehicle is recognized by the pair of the radar sensor 11 and the image sensor 12.

As an example, the target recognition device 13 determines that the recognized preceding vehicle 9 is recognized by the pair of radar sensor 11 and the image sensor 12 upon determining that the radar-recognized preceding vehicle 9 is located within a predetermined range including the image-recognized preceding vehicle 9.

The target recognition device 13 for example, determines whether identification information included in the millimeter-wave based target obtained as a function of the radar recognition results of the radar sensor 11 matches with identification information included in the image-based target obtained as a function of the image recognition results of the image sensor 12. The outer-appearance information of the millimeter-wave based target is an example of the identification information of the millimeter-wave based target, and the outer-appearance information of the image-based target is an example of the identification information of the image-based target.

If the identification information included in the millimeter-wave based target matches with the identification information included in the image-based target as a result of the determination, the target recognition device 13 determines that the same target, i.e. the same preceding vehicle, is recognized by the pair of the radar sensor 11 and the image sensor 12.

That is, if the determination in step S1110 is affirmative (YES in step S1110), the detection count routine proceeds to step S1120. Otherwise, if the determination in step S1110 is negative (NO in step S1110), the detection count routine proceeds to step S1130.

In step S1120, the target recognition device 13 executes the determination of the target's distance. Specifically, the target recognition device 13 determines the distance between the own vehicle 1 and the preceding vehicle 9 based on both the radar recognition and the image recognition. Note that one of the results of the radar recognition and the results of the image recognition can be used to execute the determination of the target's distance. Thereafter, the detection count routine proceeds to step S1140.

In step S1130, the target recognition device 13 executes the determination of the target's distance. Specifically, the target recognition device 13 determines the distance between the own vehicle 1 and the preceding vehicle 9 based on the image recognition. Note that the results of the image recognition are used to execute the determination of the target's distance. Thereafter, the detection count routine proceeds to step S1170.

In step S1140, the target recognition device 13 determines whether the radar-recognition results represent abnormal recognition. Specifically, the target recognition device 13 determines whether the radar-recognition results by the radar sensor 11 represent abnormal recognition results.

When it is determined that the radar-recognition results represent abnormal recognition results (YES in step S1140), the detection count routine proceeds to step S1160. Otherwise, when it is determined that the radar-recognition results represent normal recognition results (NO in step S1140), the detection count routine proceeds to step S1150.

Note that the abnormal recognition results according to the first embodiment mean results different from normal recognition results. For example, the abnormal recognition results include 1. A case where the resolution of the radar-recognition results is inferior to a predetermined resolution of normal radar-recognition results 2. A case where, while the same target is continuously, i.e. cyclically, detected, disturbance causes the same target to not be detected in a cycle.

In step S1150, the target recognition device 13 increments one of hardware or software first counters C1 prepared therein.

Specifically, the target recognition device 13 refers to a distance determination table prepared therein and illustrated in FIG. 8B, and recognizes one of the first counters C1, which matches with the distance between the own vehicle 1 and the preceding vehicle determined in step S1120. That is, each of the first counters C1 is used to represent the number of times preceding vehicles are normally recognized by radar recognition, and the first counters C1 are prepared for the respective distance sections determined in the distance determination table. Referring to FIG. 8B, the distance determination table includes the distance sections with regular 10 m intervals from 0 to 100 m, and the single distance section for not less than 100 m. Indexes [1] to [11] are assigned to the respective distance sections. Any intervals other than 10 m intervals can be used for the distance determination table, and another number of the distance sections can be used for the distance determination table.

After the operation in step S1150, the target recognition device 13 terminates the detection count routine.

In step S1160, the target recognition device 13 increments one of hardware or software second counters C2 prepared therein.

Specifically, the target recognition device 13 refers to the distance determination table prepared therein and illustrated in FIG. 8B, and recognizes one of the second counters C2, which matches with the distance between the own vehicle 1 and the preceding vehicle determined in step S1120. That is, each of the second counters C2 is used to represent the number of times preceding vehicles are abnormally recognized by radar recognition, and the second counters C2 are prepared for the respective distance sections determined in the distance determination table. After the operation in step S1160, the target recognition device 13 terminates the detection count routine.

In step S1170, the target recognition device 13 increments one of hardware or software third counters C3 prepared therein.

Specifically, the target recognition device 13 refers to the distance determination table prepared therein and illustrated in FIG. 8B, and recognizes one of the third counters C3, which matches with the distance between the own vehicle 1 and the preceding vehicle determined in step S1120. That is, each of the third counters C3 is used to represent the number of times preceding vehicles are recognized by only image recognition without being recognized by radar recognition. The third counters C3 are prepared for the respective distance sections determined in the distance determination table. After the operation in step S1170, the target recognition device 13 terminates the detection count routine.

1-2-2-2. Target Pair Recognition Percentage Calculation Routine

Next, the following describes the target pair-recognition percentage calculation routine as the subroutine of step S1020 in the vertical misalignment diagnostic routine with reference to FIG. 9.

The target recognition device 13 executes the target pair-recognition percentage calculation routine each time the vertical misalignment diagnostic routine proceeds to step S1020.

Figure 9A:
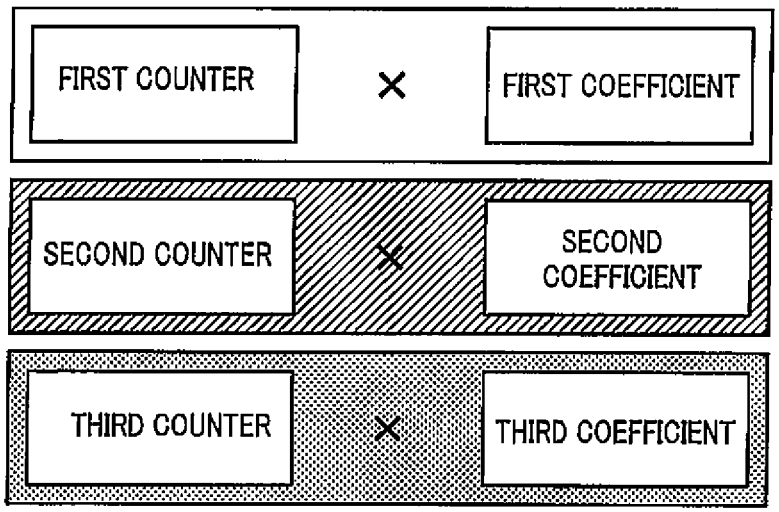
FIG. 9A is an explanatory diagram illustrating an example of an abnormality-recognition percentage calculation routine included in the vertical misalignment diagnostic routine, and equations used by the abnormality-recognition percentage calculation routine.
Figure 9B:
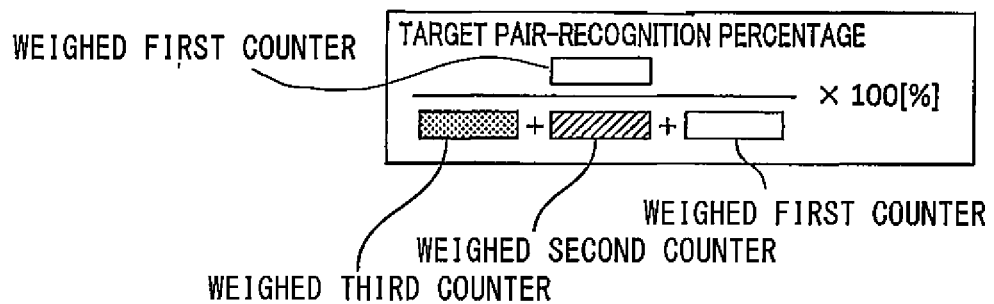
FIG. 9B is a diagram illustrating a specific solution of the first percentage calculation routine.
Figure 9C:
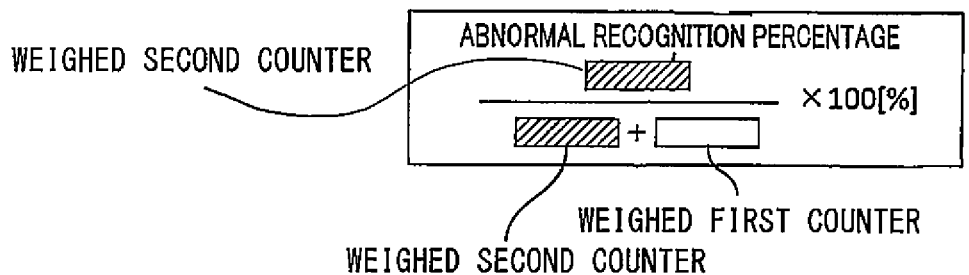
FIG. 9C is a diagram illustrating a specific solution of the second percentage calculation routine.

First, the target recognition device 13 multiplies the value of each first counter C1 by a corresponding first coefficient, multiplies the value of each second counter C2 by a corresponding second coefficient, and multiplies the value of each third counter C1 by a corresponding third coefficient (see FIG. 9A).

Note that the first, second, and third coefficients are previously established based on, for example, experiments for assigning weights to the values of the respective first, second, and third counters C1, C2, and C3.

The following describes an example of how to perform the establishment using a graph indicative of the relationship between the distance from the own vehicle 1 to a preceding vehicle and the target pair-recognition percentage described later as for example illustrated in FIG. 10A.

This graph shows that, in a region in which the distance from the own vehicle 1 to the preceding vehicle is relatively short, each of values of the target pair-recognition percentage described in detail later, if there is no axial misalignment in the radar sensor 11, has a small difference from a corresponding one of the values of the target pair-recognition percentage if there is axial misalignment in the radar sensor 11.

In contrast, this graph shows that, in a region in which the distance from the own vehicle 1 to the preceding vehicle is relatively long, each of values of the target pair-recognition percentage, if there is no axial misalignment in the radar sensor 11, has a large difference from a corresponding one of the values of the target pair-recognition percentage if there is axial misalignment in the radar sensor 11.

Figure 10A:
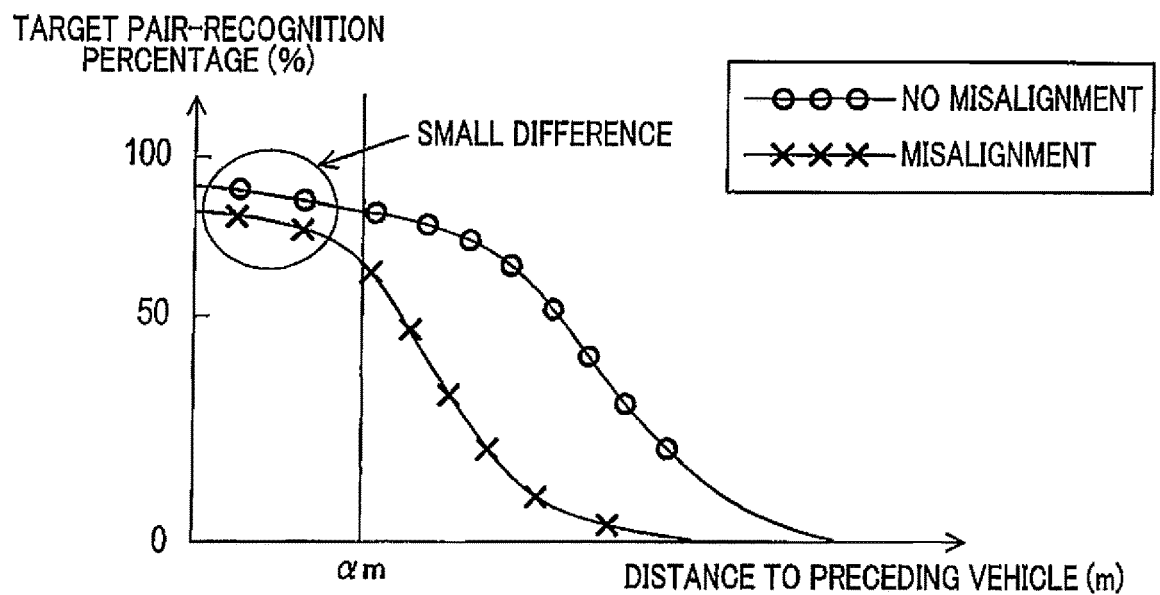
FIG. 10A is a graph illustrating the relationship between the distance from an own vehicle to a preceding vehicle and a target pair recognition percentage if no weights are assigned to all first to third counters.
Figure 10B:
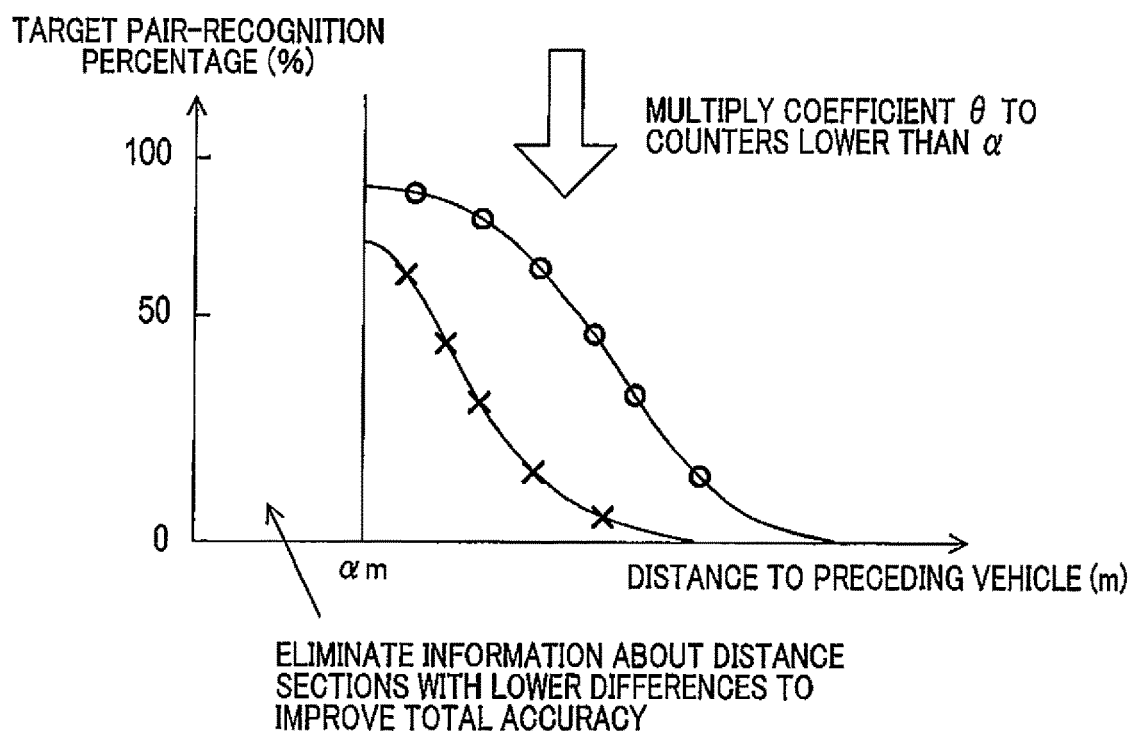
FIG. 10B is a graph illustrating the relationship between the distance from the own vehicle to the preceding vehicle and the target pair recognition percentage if a weight is assigned to at least one of the first to third counters.

For this reason, as illustrated in FIG. 10B, the coefficients are established such that weights used in the region in which the distance from the own vehicle 1 to the preceding vehicle is relatively short are smaller than weights used in the region in which the distance from the own vehicle 1 to the preceding vehicle is relatively long. In other words, the coefficients are established such that weights used in the region in which the distance from the own vehicle 1 to the preceding vehicle is relatively long are relatively larger than weights used in the region in which the distance from the own vehicle 1 to the preceding vehicle is relatively short.

In the case illustrated in FIGS. 10A and 10B, the coefficient $\theta$ of zero is configured to be multiplied by one or more counters whose corresponding distances between the vehicle 1 and the preceding vehicle are lower than a m. This eliminates information about predetermined distance sections with lower differences, thus improving the total accuracy (see FIG. 10B).

Subsequently, the target recognition device 13 calculates the target pair-recognition percentage. Specifically, for each distance section of the distance determination table, the target recognition device 13 divides the weighted value of the first counter C1 by the sum of the weighted value of the first counter C1, the weighted value of the second counter C2, and the weighted value of the third counter C3. This calculates the target pair-recognition percentage in units of % (see FIG. 9B).

The target pair-recognition percentage represents an example of the relationship, i.e. the ratio, between the number of times the preceding vehicle 9 is recognized by the pair of the radar recognition and the image recognition and the number of times the preceding vehicle 9 is recognized by at least one of the radar recognition and the image recognition. For example, the greater the number of times the preceding vehicle 9 is recognized by the pair of the radar recognition and the image recognition, the higher the target pair-recognition percentage. In contrast, the greater the number of times the preceding vehicle 9 is recognized by merely the image recognition is, the lower the target pair-recognition percentage is.

Thereafter, the target recognition device 13 terminates the target pair-recognition percentage calculation routine.

1-2-2-3. Abnormality-Recognition Percentage Calculation Routine

Next, the following describes the abnormality-recognition percentage calculation routine as the subroutine of step S1030 in the vertical misalignment diagnostic routine with reference to FIG. 9.

The target recognition device 13 executes the abnormality-recognition percentage calculation routine each time the vertical misalignment diagnostic routine proceeds to step S1030.

First, the target recognition device 13 multiplies the value of each first counter C1 by the corresponding first coefficient, and multiplies the value of each second counter C2 by the corresponding second coefficient (see FIG. 9A).

Subsequently, the target recognition device 13 calculates the abnormality-recognition percentage. Specifically, for each distance section of the distance determination table, the target recognition device 13 divides the weighted value of the second counter C2 by the sum of the weighted value of the first counter C1 and the weighted value of the second counter C2. This calculates the abnormality-recognition percentage in units of % (see FIG. 9C).

Thereafter, the target recognition device 13 terminates the abnormality-recognition percentage calculation routine.

1-2-2-4. Vertical Misalignment-Quantity Calculation Routine

Next, the following describes the vertical misalignment-quantity calculation routine as the subroutine of S1040 in the vertical misalignment diagnostic routine with reference to FIG. 11.

The target recognition device 13 executes the vertical misalignment-quantity calculation routine each time the vertical misalignment diagnostic routine proceeds to step S1040.

That is, the target recognition device 13 estimates a vertical misalignment quantity in the vertical direction, which has occurred in the radar sensor 11, in accordance with the target pair-recognition percentage calculated in step S1020 and the abnormality-recognition percentage calculated in step S1030. The vertical misalignment quantity is also referred to as a vertical misalignment estimator.

Figures 11A, 11B:
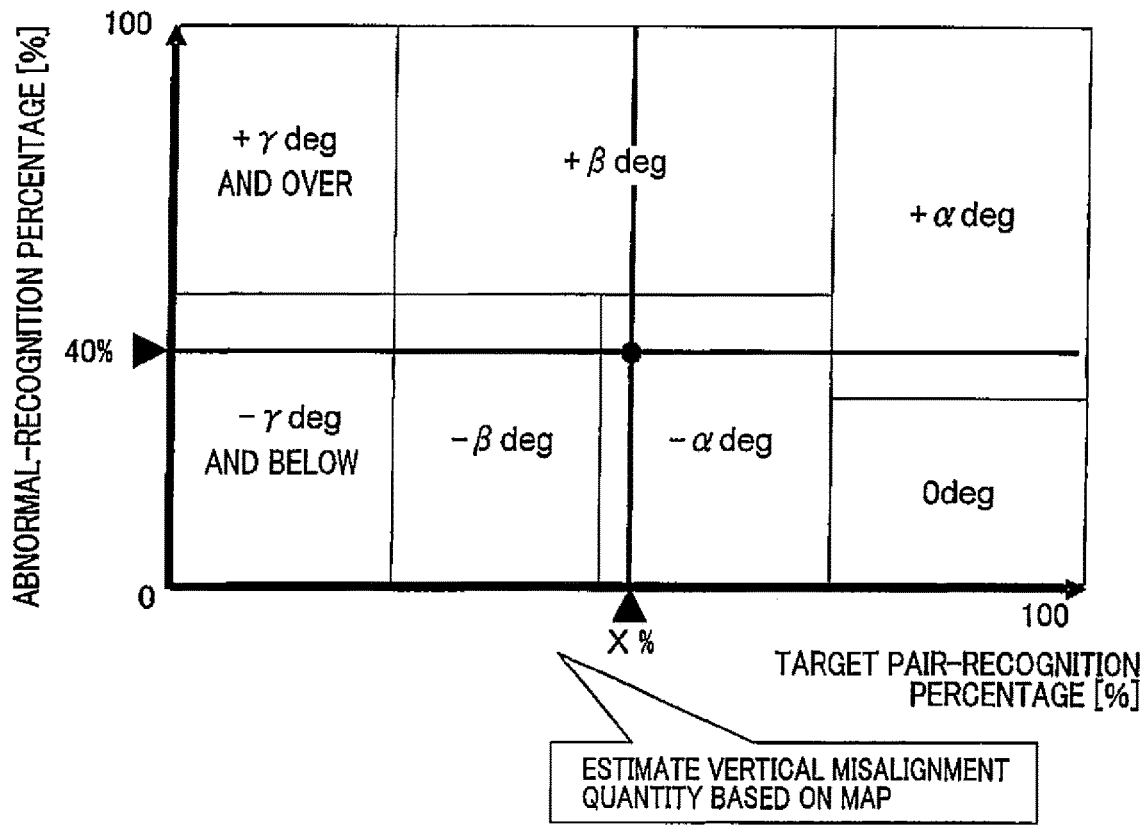
FIG. 11A is a diagram illustrating a first map used by a vertical misalignment-quantity calculation routine included in the vertical misalignment diagnostic routine.
FIG. 11B is a diagram illustrating a second map used by the vertical misalignment-quantity calculation routine included in the vertical misalignment diagnostic routine.

Specifically, the target recognition device 13 refers to a map M stored therein, illustrated as an example in FIG. 11A, and extracts, in the map M, a region corresponding to the calculated target pair-recognition percentage and abnormality-recognition percentage. Then, the target recognition device 13 determines that the value of the vertical misalignment quantity, which is allocated to the extracted region (see FIG. 11B).

Note that, in the map M, each region and the value of the vertical misalignment quantity allocated to each region are previously established based on, for example, experiments.

For example, the target pair-recognition percentage has the following characteristics that, the higher the target pair-recognition percentage is, the lower the absolute value of the vertical misalignment quantity is. That is, the target pair-recognition percentage has the following characteristics that, the lower the target pair-recognition percentage is, the higher the absolute value of the vertical misalignment quantity is.

The abnormality-recognition percentage has the following characteristics that the vertical misalignment quantity is positive when the abnormality-recognition percentage is low, and the vertical misalignment quantity is negative when the abnormality-recognition percentage is high. Note that, in the vertical plane including the radar beam axis, the upper-side misalignment of the radar beam axis with respect to the designed beam axis position represents a positive misalignment quantity. In addition, in the vertical plane including the radar beam axis, the lower-side misalignment of the radar beam axis with respect to the designed beam axis position represents a negative misalignment quantity.

Based on the characteristics, the target recognition device 13 can establish each region and the value of the vertical misalignment quantity allocated to each region in the map M.

An example illustrated in FIG. 11B represents that the value of the vertical misalignment quantity is −α degrees (deg) when the target pair-recognition percentage is X % and the abnormality-recognition percentage is Y %.

Thereafter, the target recognition device 13 terminates the vertical misalignment-quantity calculation routine.

1-3. Advantageous Effects

As described above, the target recognition device 13 in the drive assist system 10 according to the first embodiment determines whether there is a possibility that the detection performance of the radar sensor 11 has fallen before performing detection of vertical misalignment in the radar sensor 11. This disables the target recognition device 13 from executing the diagnosis of misalignment in the vertical direction if it is determined that there is a possibility that the detection performance of the radar sensor 11 has fallen.

Specifically, the vertical misalignment diagnostic routine according to the first embodiment diagnoses whether there is vertical misalignment in the radar sensor 11 based on the target pair-recognition percentage, i.e. the relationship, i.e. the ratio, between the number of times a target, such as a preceding vehicle, is recognized by the pair of the radar recognition and the image recognition and the number of times the target is recognized by at least one of the radar recognition and the image recognition.

In other words, the vertical misalignment diagnostic routine according to the first embodiment diagnoses whether there is vertical misalignment in the radar sensor 11 based on whether the target is recognized by the pair of the radar recognition and the image recognition.

The situation where the target is not recognized by either the radar recognition and the image recognition may occur due to reasons other than the vertical misalignment in the radar sensor 11. That is, the situation where the target is not recognized by either the radar recognition and the image recognition may occur due to reduction in the target detection performance of the radar sensor 11.

Specifically, let us assume that the situation where the target is not recognized by both the radar recognition and the image recognition occurs due to reduction in the target detection performance of the radar sensor 11. In this assumption, executing the vertical misalignment routine according to the first embodiment may cause misalignment of the radar sensor 11 in the vertical direction to be erroneously detected although there is no misalignment of the radar sensor 11 in the vertical direction.

From this viewpoint, the target recognition device 13 according to the first embodiment is configured not to execute the diagnosis of misalignment in the vertical direction upon determining that there is a possibility that the target detection performance of the radar sensor 11 has fallen.

For this reason, the first embodiment achieves the first advantageous effect that prevents the situation where there is a possibility that the target detection performance of the radar sensor 11 has fallen from being erroneously detected as the situation that vertical misalignment has occurred. Specifically, the first embodiment reduces erroneous detection of vertical misalignment in a beam sensor, such as the beam sensor 11.

Otherwise, the target recognition device 13 executes the vertical misalignment diagnostic routine upon determining that there is no possibility that the target detection performance of the radar sensor 11 has fallen, thus diagnosing whether there is misalignment of a beam sensor, such as the radar sensor 11, in the vertical direction. Then, the target recognition device 13 detects the vertical misalignment quantity upon diagnosing that there is vertical misalignment in the beam sensor.

That is, the target recognition device 13 diagnoses whether there is vertical misalignment in the beam sensor while it is reliably determined that there is no possibility that the target detection performance of the radar sensor 11 has fallen. Then, the target recognition device 13 detects the vertical misalignment quantity upon diagnosing that there is vertical misalignment in the beam sensor.

For this reason, the first embodiment achieves the second advantageous effect of enabling the various types of control for improving the running safety of the vehicle 1 to be carried out with higher accuracy.

The target recognition device 13 performs radar recognition of a preceding vehicle 9 running in front of the own vehicle 1. Additionally, the target recognition device 13 performs image recognition of the preceding vehicle 9 running in front of the own vehicle 1 based on a captured image of the front scene of the own vehicle 1.

Then, the target recognition device 30 calculates, based on the radar-recognition results and the image-recognition results, the percentage of the number of times the preceding vehicle 9 is recognized by the pair of the radar recognition and the image recognition to the number of times the preceding vehicle 9 is recognized by at least the image recognition. Note that an example of the percentage is the pair-recognition percentage. The target recognition device 13 detects, based on the calculated value of the percentage, vertical misalignment, which has occurred in a beam sensor, such as the radar sensor 11 (see (a) and (b) in FIG. 12). This enables the first embodiment to achieve the third advantageous effect of detecting vertical misalignment of the radar sensor 11 installed in the own vehicle 1 while the own vehicle 1 is running with higher accuracy.

The target recognition device 13 calculates a value of the target pair-recognition percentage for each of prepared distances between the own vehicle 1 and the preceding vehicle 9 in the vertical misalignment diagnostic routine. Then, the target recognition device 13 adds predetermined weights to the values of the target pair-recognition percentage for the respective prepared distances, and calculates the sum of the weighed values. The target recognition device 13 determines whether there is vertical misalignment, which has occurred in the radar sensor 11, as a function of the calculated sum. This enables the first embodiment to achieve the fourth advantageous effect of detecting vertical misalignment of the radar sensor 11 installed in the own vehicle 1 with further higher accuracy.

The target recognition device 13 calculates the percentage of the preceding vehicle 9 being normally recognized, i.e. the normal recognition percentage, and the percentage of the preceding vehicle 9 being abnormally recognized, i.e. the abnormality-recognition percentage in the vertical misalignment diagnostic routine. Then, the target recognition device 13 determines whether there is vertical misalignment, which has occurred in a beam sensor, such as the radar sensor 11, as a function of the calculated normal recognition percentage and the calculated abnormality-recognition percentage. In addition, the target recognition device 13

(1) Determines whether an upper-side misalignment or a lower-side misalignment has occurred upon determining that there is vertical misalignment (2) Determines a misalignment quantity of the upper-side or lower-side misalignment.

This enables the first embodiment to achieve the fifth advantageous effect of detecting vertical misalignment of the radar sensor 11 installed in the own vehicle 1, which is running, with further higher accuracy.

Note that the target recognition device 13 according to the first embodiment serves as an example of a detection device, an obtaining means, a determining means, a diagnosis means, a radar recognition means, and an image recognition means. The operation in step S200 serves as an example of the determining means and the operation in step S300 serves as an example of a detection means.

2. Second Embodiment 2-1. Different Points from First Embodiment

The fundamental structure of the second embodiment is basically identical to that of the first embodiment except for the following different point. So, the following mainly describes the different points while omitting the descriptions of the common structure.

Figure 13:
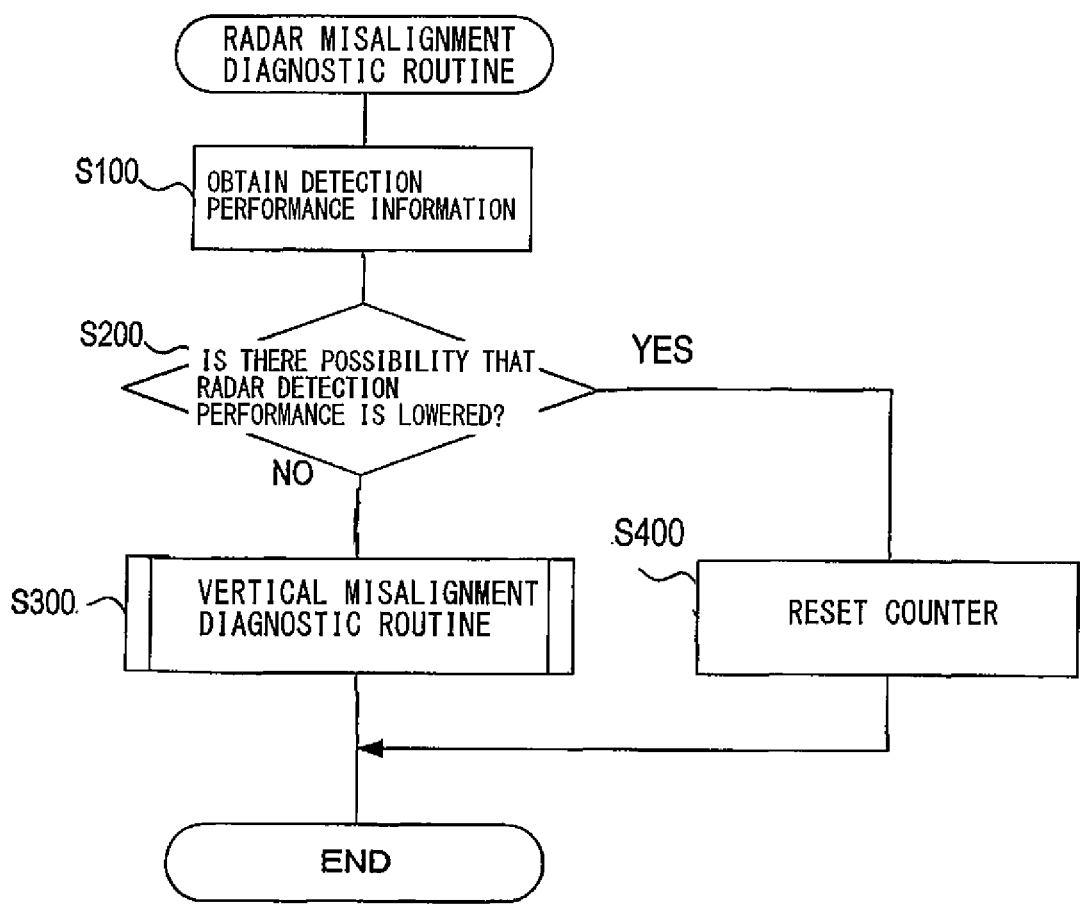
FIG. 13 is a flowchart schematically illustrating a misalignment diagnostic routine according to the second embodiment of the present invention.

Referring to FIG. 13, the target recognition device 13 according to the second embodiment resets all the counters C1 to C3 upon determining that there is a possibility that the target detection performance of the radar sensor 11 has fallen.

2-2. Routine

Next, the following describes the radar misalignment diagnostic routine according to the second embodiment with reference to the flowchart of FIG. 13.

The target recognition device 13 executes the same operations as the respective operations in steps S100 and S200 according to the first embodiment.

Upon determining that there is no possibility that the detection performance of the radar sensor 11 has fallen (NO in step S200), the target recognition device 13 executes the vertical misalignment diagnostic routine in step S300 in the similar procedure as the first embodiment. The target recognition device 13 terminates the radar misalignment diagnostic routine when completing the vertical misalignment diagnostic routine.

Otherwise, upon determining that there is a possibility that the detection performance of the radar sensor 11 has fallen (YES in step S200), the target recognition device 13 executes the operation in step S400 to reset all the counters C1, C2, and C3. The in step S400 by the CPU 13 or a hardware structure that carries out the operation in step S400 serves as, for example, a reset means.

Specifically, the target recognition device 13 resets the counters used to execute the count detection routine, i.e. the first counter C1, second counter C2, and third counter C3. Thereafter, the target recognition device 13 terminates the radar misalignment diagnostic routine.

2-3. Advantageous Effects

The second embodiment described in detail above achieves the following advantageous effects in addition to the first to fifth advantageous effects of the first embodiment.

The target recognition device 13 resets all the counters used to execute the count detection routine, i.e. all the first counter C1, second counter C2, and third counter C3 upon determining that there is a possibility that the detection performance of the radar sensor 11 has fallen in the radar misalignment diagnostic routine.

Let us assume that there is a possibility that the detection performance of the radar sensor 11 has fallen. In addition, let us assume that it takes some to obtain detection performance information indicative of the occurrence of the reduction of the detection performance, which has elapsed since the reduction of the detection performance actually occurred.

Under these assumptive situations, the target recognition device 13 resets the first to third counters C1 to C3 when obtaining the detection performance information indicative of the occurrence of the reduction of the detection performance. This prevents the counted values of the first to third counters C1 to C3 for the period from the time when the reduction of the detection performance actually occurred to the time when the detection performance information indicative of the occurrence of the reduction of the detection performance is actually obtained, i.e. incorrectly counted values, from being used in the vertical misalignment diagnostic routine.

The second embodiment therefore achieves the sixth advantageous effect of (1) Higher-accuracy determination of whether there is vertical misalignment in the vertical misalignment diagnostic routine (2) Higher-accuracy detection of vertical misalignment when it is determined that there is vertical misalignment.

In the second embodiment, the target recognition device 13 serves as, for example, a first count means, a second count means, and a reset means. The operation in step S1170 serves as an example of the first count means, the operations in steps S1150 and S1160 serve as an example of the second count means, and the operation in step S400 serves as an example of the reset means.

3. Third Embodiment

3-1. Different Points from First Embodiment

The fundamental structure of the third embodiment is basically identical to that of the first embodiment except for the following different point. So, the following mainly describes the different point while omitting the descriptions of the common structure.

The target recognition device 13 according to the first embodiment detects, based on the radar recognition and the image recognition of the preceding vehicle 9, vertical misalignment that has occurred in the radar sensor 11.

In contrast, the target recognition device 13 according to the third embodiment performs misalignment detection depending on the height of the preceding vehicle 9.

3-2. Routine

Specifically, the target recognition device 13 executes, in step 1010, a detection count routine illustrated in FIG. 14 in place of the detection count routine illustrated in FIG. 8, and executes, in step S1020, a target pair-recognition percentage calculation routine illustrated in FIG. 15 in place of the target pair-recognition percentage calculation routine illustrated in FIG. 9. In addition, the target recognition device 13 executes, in step S1030, an abnormality-recognition percentage calculation routine illustrated in FIG. 15 in place of the abnormality-recognition percentage calculation routine illustrated in FIG. 9. Note that the target recognition device 13 executes a vertical misalignment-quantity calculation routine in step S1040, which is identical to the vertical misalignment-quantity calculation routine according to the first embodiment.

Next, the following sequentially describes the detection count routine, the target pair-recognition percentage calculation routine, and the abnormality-recognition calculation routine according to the third embodiment.

3-2-1 Detection Count Routine

Next, the following describes the detection count routine carried out by the operation in step S1010 of the vertical misalignment diagnostic routine with reference to FIG. 14.

First, in step S1205, like step S1110, the target recognition device determines whether an image-based target matches with a millimeter-wave based target. That is, the target recognition device 13 determines whether the same preceding vehicle 9 is recognized by the pair of the radar recognition by the radar sensor 11 and the image recognition by the image sensor 12.

If the determination in step S1205 is affirmative (YES in step S1205), the detection count routine proceeds to step S1210. Otherwise, if the determination in step S1205 is negative (NO in step S1205), the detection count routine proceeds to step S1215.

In step S1210, like step S1120, the target recognition device 13 executes the determination of the target's distance. Specifically, the target recognition device 13 determines the distance between the own vehicle 1 and the preceding vehicle 9 recognized by both the radar recognition and the image recognition. Note that one of the results of the radar recognition and the results of the image recognition can be used to execute the determination of the target's distance. Thereafter, the detection count routine proceeds to step S1220.

In step S1215, like step S1130, the target recognition device 13 executes the determination of the target's distance. Specifically, the target recognition device 13 determines the distance between the own vehicle 1 and the preceding vehicle 9 recognized by the image recognition. Note that the results of the image recognition are used to execute the determination of the target's distance. Thereafter, the detection count routine proceeds to step S1235.

In step S1220, like step S1140, the target recognition device 13 determines whether the radar-recognition results represent abnormal recognition. Specifically, the target recognition device 13 determines whether the radar-recognition results by the radar sensor 11 represent abnormal recognition results.

When it is determined that the radar-recognition results represent abnormal recognition results (YES in step S1220), the detection count routine proceeds to step S1230. Otherwise, when it is determined that the radar-recognition results represent normal recognition results (NO in step S1220), the detection count routine proceeds to step S1225.

In step S1225, the target recognition device 13 determines whether the vehicle height of the preceding vehicle 9 is higher than the vehicle heights of standard vehicles. Specifically, the target recognition device 13 determines whether the vehicle height of the preceding vehicle 9 is higher than a predetermined threshold in accordance with the results of the image recognition. Note that the predetermined threshold is previously set based on, for example, experiments in order to remove preceding vehicles, such as trucks, whose vehicle heights are higher than the vehicle heights of standard vehicles (see FIGS. 12C and 12D).

If the determination in step S1225 is affirmative (YES in step S1225), the detection count routine proceeds to step S1245. Otherwise, if the determination in step S1225 is negative (NO in step S1225), the detection count routine proceeds to step S1240.

In step S1230, like step S1225, the target recognition device 13 determines whether the vehicle height of the preceding vehicle 9 is higher than the vehicle heights of standard vehicles. Specifically, the target recognition device 13 determines whether the vehicle height of the preceding vehicle 9 is higher than the predetermined threshold in accordance with the results of the image recognition.

If the determination in step S1230 is affirmative (YES in step S1230), the detection count routine proceeds to step S1255. Otherwise, if the determination in step S1230 is negative (NO in step S1230), the detection count routine proceeds to step S1250.

In step S1235, like step S1225, the target recognition device 13 determines whether the vehicle height of the preceding vehicle 9 is higher than the vehicle heights of standard vehicles. Specifically, the target recognition device 13 determines whether the vehicle height of the preceding vehicle 9 is higher than the predetermined threshold in accordance with the results of the image recognition.

If the determination in step S1235 is affirmative (YES in step S1235), the detection count routine proceeds to step S1265. Otherwise, if the determination in step S1235 is negative (NO in step S1235), the detection count routine proceeds to step S1260.

In step S1240, the target recognition device 13 increments one of hardware or software fourth counters C4 prepared therein.

Figures 14A, 14B:
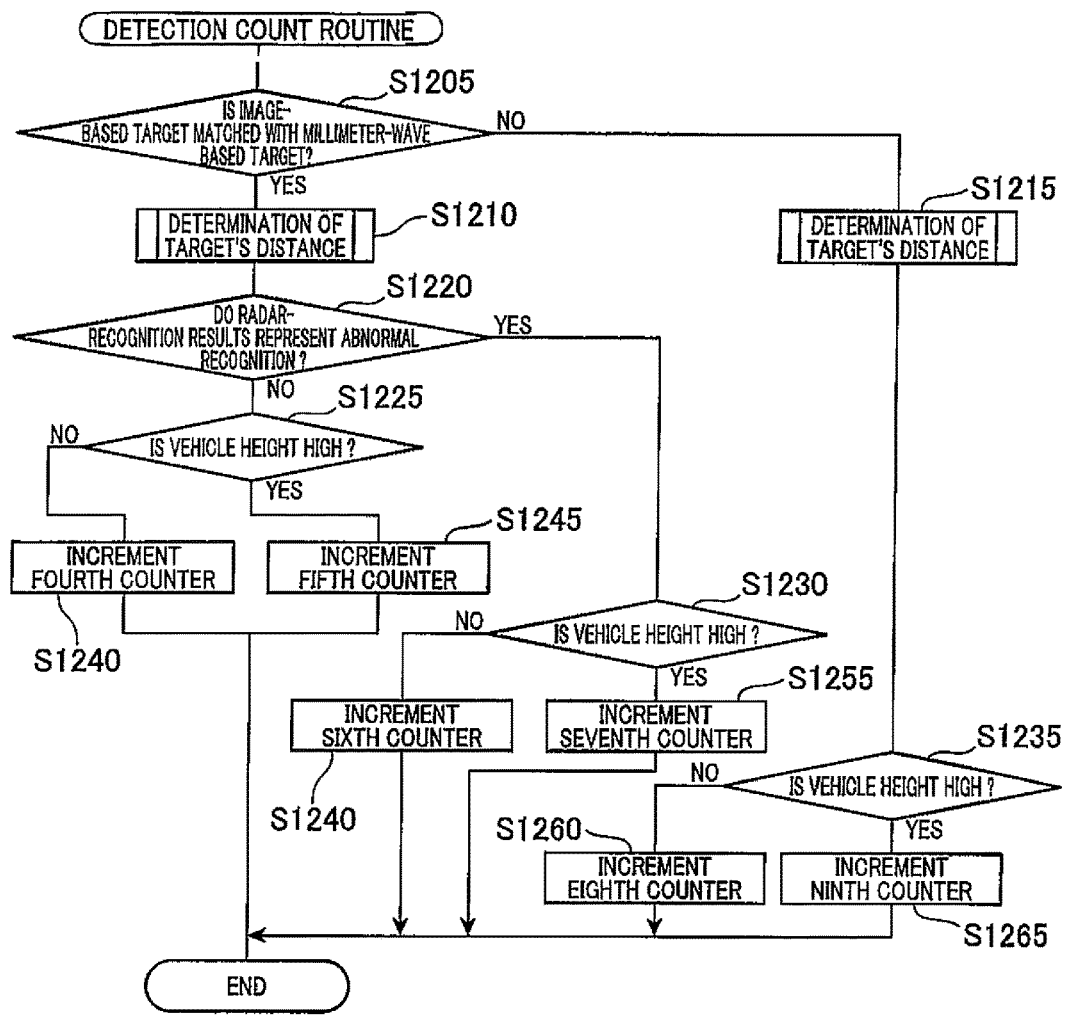
FIG. 14A is a flowchart illustrating a detection count routine according to the third embodiment of the present invention.
FIG. 14B is a diagram illustrating a distance determination table according to the third embodiment of the present invention.

Specifically, the target recognition device 13 refers to a distance determination table prepared therein and illustrated in FIG. 14B, and recognizes one of the fourth counters C4, which matches with the distance between the own vehicle 1 and the preceding vehicle 9 determined in step S1210. The information stored in the distance determination table is set to be identical to the information stored in the distance determination table illustrated in FIG. 8B, but can be set to be different the information stored in the distance determination table illustrated in FIG. 8B.

That is, each of the fourth counters C4 is used to represent the number of times preceding vehicles 9 whose heights are lower than the predetermined threshold are normally recognized by radar recognition, and the fourth counters C4 are prepared for the respective distance sections determined in the distance determination table.

After the operation in step S1240, the target recognition device 13 terminates the detection count routine.

In step S1245, the target recognition device 13 increments one of hardware or software fifth counters C5 prepared therein.

Specifically, the target recognition device 13 refers to the distance determination table prepared therein and illustrated in FIG. 14B, and recognizes one of the fifth counters C5, which matches with the distance between the own vehicle 1 and the preceding vehicle 9 determined in step S1210. That is, each of the fifth counters C5 is used to represent the number of times preceding vehicles whose heights are equal to or higher than the predetermined threshold are normally recognized by radar recognition, and the fifth counters C5 are prepared for the respective distance sections determined in the distance determination table.

After the operation in step S1245, the target recognition device 13 terminates the detection count routine.

In step S1250, the target recognition device 13 increments one of hardware or software sixth counters C6 prepared therein.

Specifically, the target recognition device 13 refers to the distance determination table prepared therein and illustrated in FIG. 14B, and recognizes one of the sixth counters C6, which matches with the distance between the own vehicle 1 and the preceding vehicle determined in step S1210. That is, each of the sixth counters C6 is used to represent the number of times preceding vehicles whose heights are lower than the predetermined threshold are abnormally recognized by radar recognition, and the sixth counters C6 are prepared for the respective distance sections determined in the distance determination table.

After the operation in step S1250, the target recognition device 13 terminates the detection count routine.

In step S1255, the target recognition device 13 increments one of hardware or software seventh counters C7 prepared therein.

Specifically, the target recognition device 13 refers to the distance determination table prepared therein and illustrated in FIG. 14B, and recognizes one of the seventh counters C7, which matches with the distance between the own vehicle 1 and the preceding vehicle 9 determined in step S1210. That is, each of the seventh counters C7 is used to represent the number of times preceding vehicles whose heights are equal to or higher than the predetermined threshold are abnormally recognized by radar recognition, and the seventh counters C7 are prepared for the respective distance sections determined in the distance determination table.

After the operation in step S1255, the target recognition device 13 terminates the detection count routine.

In step S1260, the target recognition device 13 increments one of hardware or software eighth counters C8 prepared therein.

Specifically, the target recognition device 13 refers to the distance determination table prepared therein and illustrated in FIG. 14B, and recognizes one of the eighth counters C8, which matches with the distance between the own vehicle 1 and the preceding vehicle 9 determined in step S1215. That is, each of the eighth counters C8 is used to represent the number of times preceding vehicles whose heights are lower than the predetermined threshold are recognized by only image recognition without being recognized by radar recognition. The eighth counters C8 are prepared for the respective distance sections determined in the distance determination table. After the operation in step S1260, the target recognition device 13 terminates the detection count routine.

In step S1265, the target recognition device 13 increments one of hardware or software ninth counters C9 prepared therein.

Specifically, the target recognition device 13 refers to the distance determination table prepared therein and illustrated in FIG. 14B, and recognizes one of the ninth counters C9, which matches with the distance between the own vehicle 1 and the preceding vehicle 9 determined in step S1215. That is, each of the ninth counters C9 is used to represent the number of times preceding vehicles whose heights are equal to or higher than the predetermined threshold are recognized by only image recognition without being recognized by radar recognition. The ninth counters C9 are prepared for the respective distance sections determined in the distance determination table. After the operation in step S1265, the target recognition device 13 terminates the detection count routine.

3-2-2 Target Pair-Recognition Percentage Calculation Routine

Figure 15A:
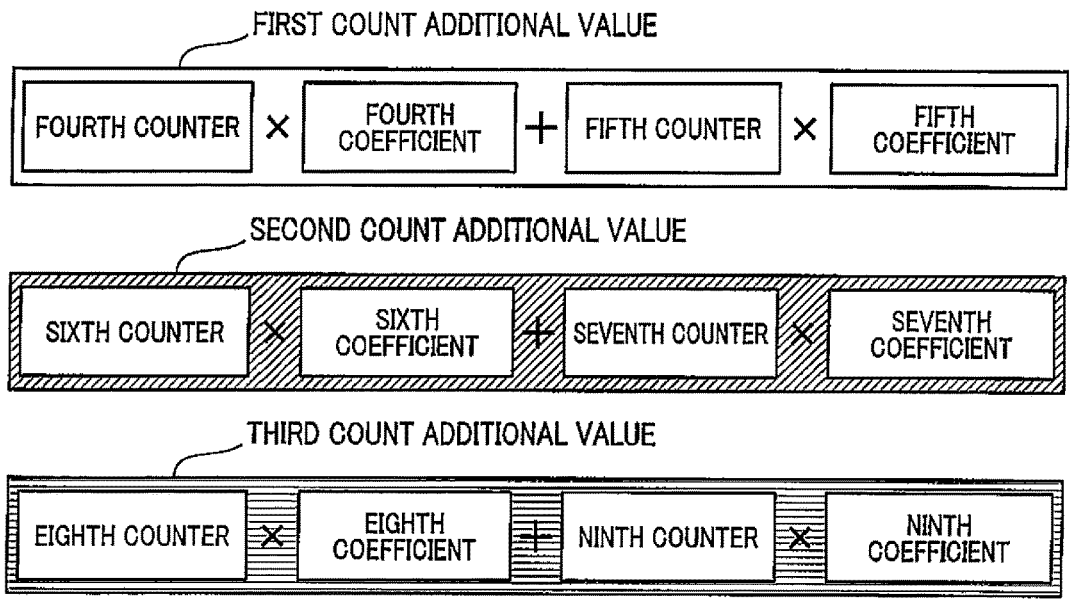
FIG. 15A is an explanatory diagram illustrating equations used by a target pair-recognition percentage calculation routine and an abnormality-recognition percentage calculation routine according to the third embodiment of the present invention.
Figure 15B:
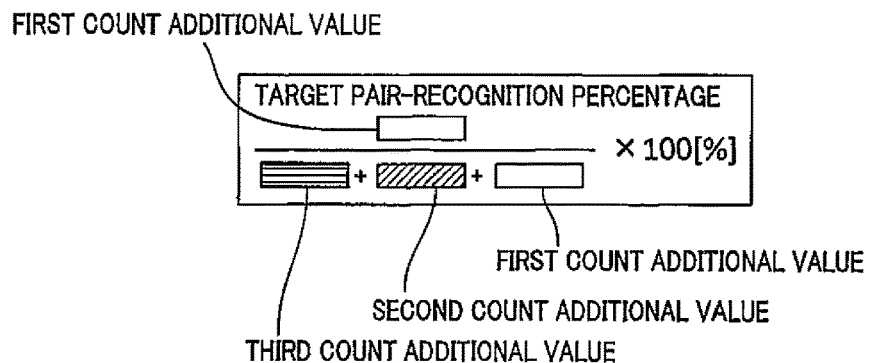
FIG. 15B is a diagram illustrating a specific solution of the first percentage calculation routine according to the third embodiment.
Figure 15C:
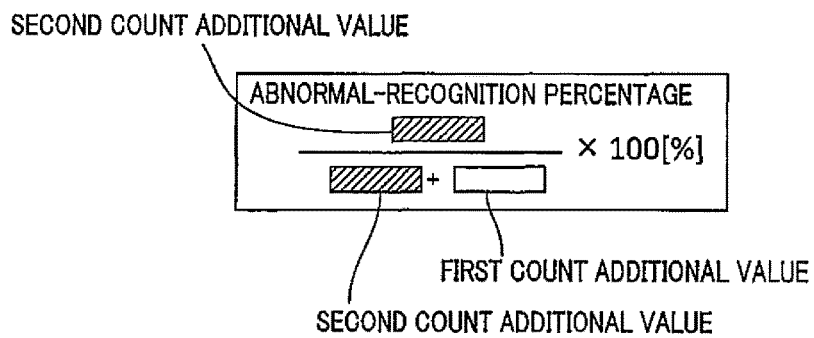
FIG. 15C is a diagram illustrating a specific solution of the second percentage calculation routine according to the third embodiment.

Next, the following describes the target pair-recognition percentage calculation routine executed in step S1020 of the vertical misalignment diagnostic routine with reference to FIGS. 15A to 15C.

First, the target recognition device 13 multiplies the value of each fourth counter C4 by a corresponding fourth coefficient, and multiplies the value of each fifth counter C5 by a corresponding fifth coefficient (see FIG. 15A). Then, the target recognition device 13 calculates the sum of the value of each fourth counter C4 obtained by the multiplication and the value of the corresponding fifth counter C5 obtained by the multiplication, thus calculating a first count additional value for each of the distance sections of the distance determination table.

In addition, the target recognition device 13 multiplies the value of each sixth counter C6 by a corresponding sixth coefficient, and multiplies the value of each seventh counter C7 by a corresponding seventh coefficient (see FIG. 15A). Then, the target recognition device 13 calculates the sum of the value of each sixth counter C6 obtained by the multiplication and the value of the corresponding seventh counter C7 obtained by the multiplication, thus calculating a second count additional value for each of the distance sections of the distance determination table.

Moreover, the target recognition device 13 multiplies the value of each eighth counter C8 by a corresponding eighth coefficient, and multiplies the value of each ninth counter C9 by a corresponding ninth coefficient (see FIG. 15A). Then, the target recognition device 13 calculates the sum of the value of each eighth counter C8 obtained by the multiplication and the value of the corresponding ninth counter C9 obtained by the multiplication, thus calculating a third count additional value for each of the distance sections of the distance determination table.

Note that the fourth to ninth coefficients are previously established based on, for example, experiments for assigning weights to the values of the respective fourth to ninth counters.

Next, the target recognition device 13 calculates the target pair-recognition percentage. Specifically, for each distance section of the distance determination table, the target recognition device 13 divides the first count additional value by the sum of the second and third count additional values. This calculates the target pair-recognition percentage in units of % (see FIG. 15B).

Thereafter, the target recognition device 13 terminates the target pair-recognition percentage calculation routine.

3-2-2 Abnormality-Recognition Percentage Calculation Routine

Next, the following describes the abnormality-recognition percentage calculation routine executed in step S1030 of the vertical misalignment diagnostic routine with reference to FIGS. 15A to 15C.

First, the target recognition device 13 multiplies the value of each fourth counter C4 by the corresponding fourth coefficient, and multiplies the value of each fifth counter C5 by the corresponding fifth coefficient (see FIG. 15A). Then, the target recognition device 13 calculates the sum of the value of each fourth counter C4 obtained by the multiplication and the value of the corresponding fifth counter C5 obtained by the multiplication, thus calculating the first count additional value for each of the distance sections of the distance determination table.

In addition, the target recognition device 13 multiplies the value of each sixth counter C6 by the corresponding sixth coefficient, and multiplies the value of each seventh counter C7 by the corresponding seventh coefficient (see FIG. 15A). Then, the target recognition device 13 calculates the sum of the value of each sixth counter C6 obtained by the multiplication and the value of the corresponding seventh counter C7 obtained by the multiplication, thus calculating the second count additional value for each of the distance sections of the distance determination table.

Next, the target recognition device 13 calculates the abnormality-recognition percentage. Specifically, for each distance section of the distance determination table, the target recognition device 13 divides the first count additional value by the sum of the first and second count additional values. This calculates the abnormality-recognition percentage in units of % (see FIG. 15C).

Thereafter, the target recognition device 13 terminates the abnormality-recognition percentage calculation routine.

3-3. Advantageous Effect

The third embodiment described in detail above achieves the following advantageous effects in addition to the advantageous effects of the first embodiment.

The target recognition device 13 according to the third embodiment calculates the target pair-recognition percentage and the abnormality-recognition percentage for each of the different vehicle heights of the preceding vehicles 9 in the vertical misalignment diagnostic routine. Then, the target recognition device 13 according to the third embodiment detects axial misalignment of the radar sensor 11 in the vertical plane according to the target pair-recognition percentage and the abnormality-recognition percentage calculated for each of the different vehicle heights of the preceding vehicles 9. This results in higher-accuracy detection of axial misalignment.

In addition, the target recognition device 13 determines whether the vehicle height of the preceding vehicle 9 is higher than the predetermined threshold in the vertical misalignment diagnostic routine, i.e. the detection count routine. Then, the target recognition device 13 calculates the target pair-recognition percentage and the abnormality-recognition percentage while eliminating the preceding vehicles 9 whose heights are higher than the predetermined threshold. This results in further higher-accuracy detection of axial misalignment.

4. Fourth Embodiment

4-1. Different Points from First Embodiment

The fundamental structure of the fourth embodiment is basically identical to that of the first embodiment except for the following different point. So, the following mainly describes the different point while omitting the descriptions of the common structure.

Figure 16:
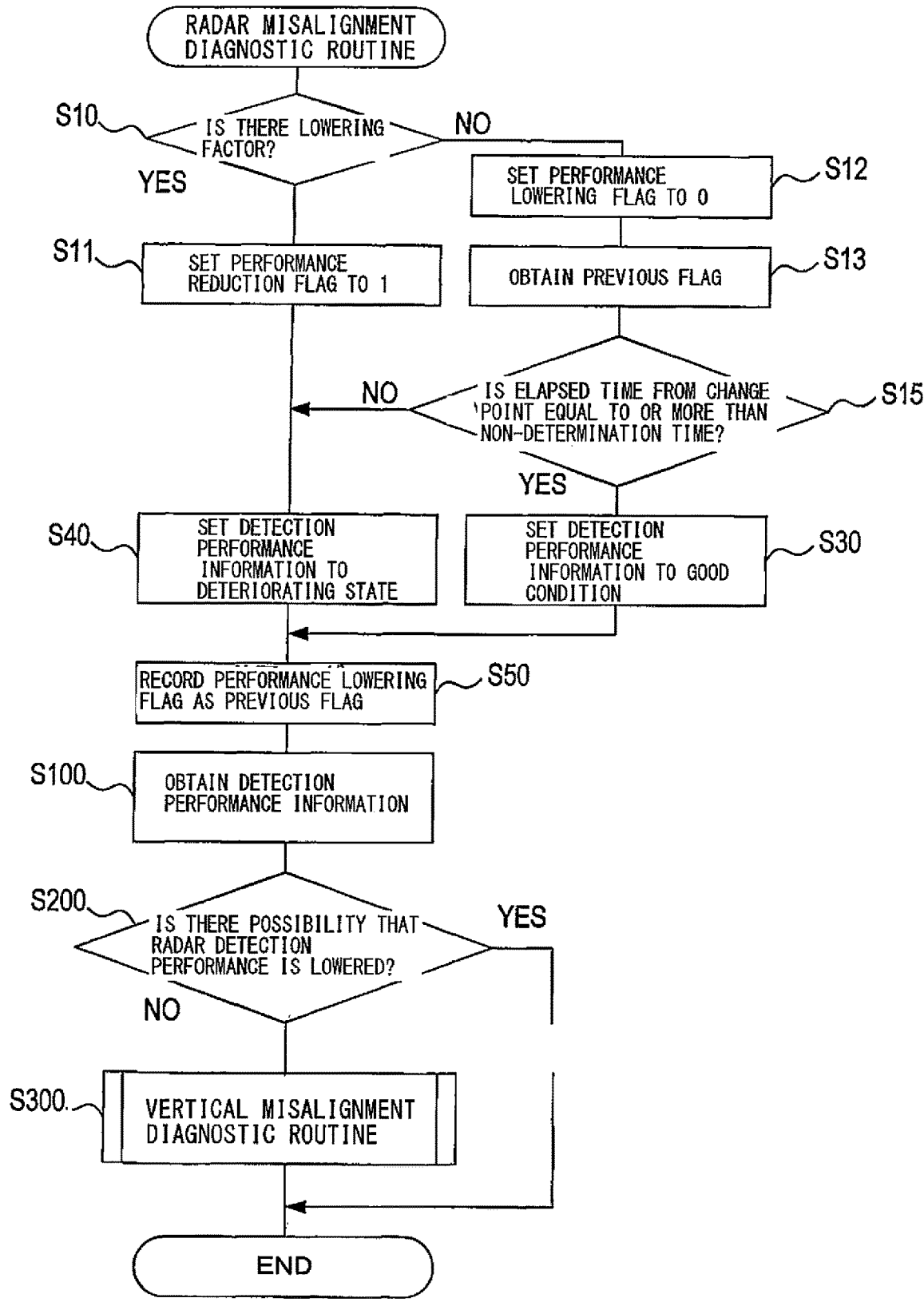
FIG. 16 is a flowchart schematically illustrating a misalignment diagnostic routine according to the fourth embodiment of the present invention.

Referring to FIG. 16, the fourth embodiment is different from the first embodiment in that a task of determining detection performance information, which corresponds to steps S10 to S50, is added to the radar misalignment diagnostic routine.

4-2. Routine

The following describes the radar misalignment diagnostic routine according to the fourth embodiment with reference to the flowchart of FIG. 16.

As described above, the target recognition device 13, i.e. its CPU 13, repeatedly executes the radar misalignment diagnostic routine with the auto cruise switch (ACC) switch on every predetermined interval. Note that a unit execution of the radar misalignment diagnostic routine will be referred to as a cycle.

In a current cycle of the radar misalignment diagnostic routine, the target recognition device 13 determines whether a lowering factor has occurred, which may cause the target detection performance of the radar sensor 11 in step S10. For example, rain is considered as the lowering factor. Specifically, the target recognition device 13 determines that a lowering factor has occurred if it is raining, i.e. if a wiper device of the vehicle 1 is operating to wipe rain drops or the like on the front windshield and/or rear windshield; the wiper device is illustrated by a phantom line in FIG. 1. It is possible to determine whether it is raining, based on images captured by the image sensor 12. The radar misalignment diagnostic routine proceeds to step S11 when it is determined that a lowering factor has occurred, and proceeds to step S12 when it is determined that there are no lowering factors.

In step S11 to which the radar misalignment diagnostic routine proceeds when it is determined that a lowering factor has occurred, the target recognition device 13 sets a performance lowering flag, which is one bit information having a logical low level expressed by 0 or a logical high level expressed by 1. Specifically, in step S11, the target recognition device 13 sets the performance lowering flag to 1. When the operation in step S11 is completed, the radar misalignment diagnostic routine proceeds to step S40.

In step S12 to which the radar misalignment diagnostic routine proceeds when it is determined that the lowering factor is not occurring, the target recognition device 13 resets the performance lowering flag. Specifically, in step S12, the target recognition device 13 sets the performance lowering flag to 0.

Following the operation in step S12, the target recognition device 13 obtains an immediately previous value of the flag, i.e. a value of the performance lowering flag in the immediately previous cycle in step S13. As described later, the immediately previous value of the flag has been stored in the RAM 33.

Next, the target recognition device 13 determines whether time, which has elapsed since the change point of the performance reduction factor, is equal to or more than a predetermined non-determination period in step S15.

Note that the change point of the performance reduction factor represents timing at which the performance reduction factor changes from the state where a lowering factor has occurred to the state where there are no lowering factors. The change point of the performance reduction factor according to the fourth embodiment represents timing at which the rainy state changes to the rain stopped state. The non-determination period is determined based on the performance reduction factor. For example, the non-determination period is set to a predetermined time required to dry rain drops adhered to the detection window of the radar sensor 11 after the stop of rain.

Note that the target recognition device 13, i.e. its CPU 31, includes, for example, a change point determiner 13f, which is, for example, different from the radar misalignment diagnostic routine. The change point determiner 13f determines the change point of the performance reduction factor according to the performance lowering flag. The change point determiner 13f is configured to record the elapsed time since the change point of the performance reduction factor in the RAM 33.

The radar misalignment diagnostic routine proceeds to step S30 when it is determined that the elapsed time since the change point of the performance reduction factor is equal to or more than the non-determination period (YES in step S15). Otherwise, the radar misalignment diagnostic routine proceeds to step S40 when it is determined that the elapsed time since the change point of the performance reduction factor is less than the non-determination period (NO in step S15).

In step S30, the target recognition device 13 sets the detection performance information of the radar sensor 11 to good state. Thereafter, the radar misalignment diagnostic routine proceeds to step S50.

In step S40, the target recognition device 13 sets the detection performance information of the radar sensor 11 to deteriorating state. Thereafter, the radar misalignment diagnostic routine proceeds to step S50.

In the following step S50, the target recognition device 13 records a current value of the detection reduction flag in the RAM 33 as the immediately previous value of the flag.

Next, the target recognition device 13 executes the following steps S100 to S300 in the similar procedure as the first embodiment.

Figure 17:
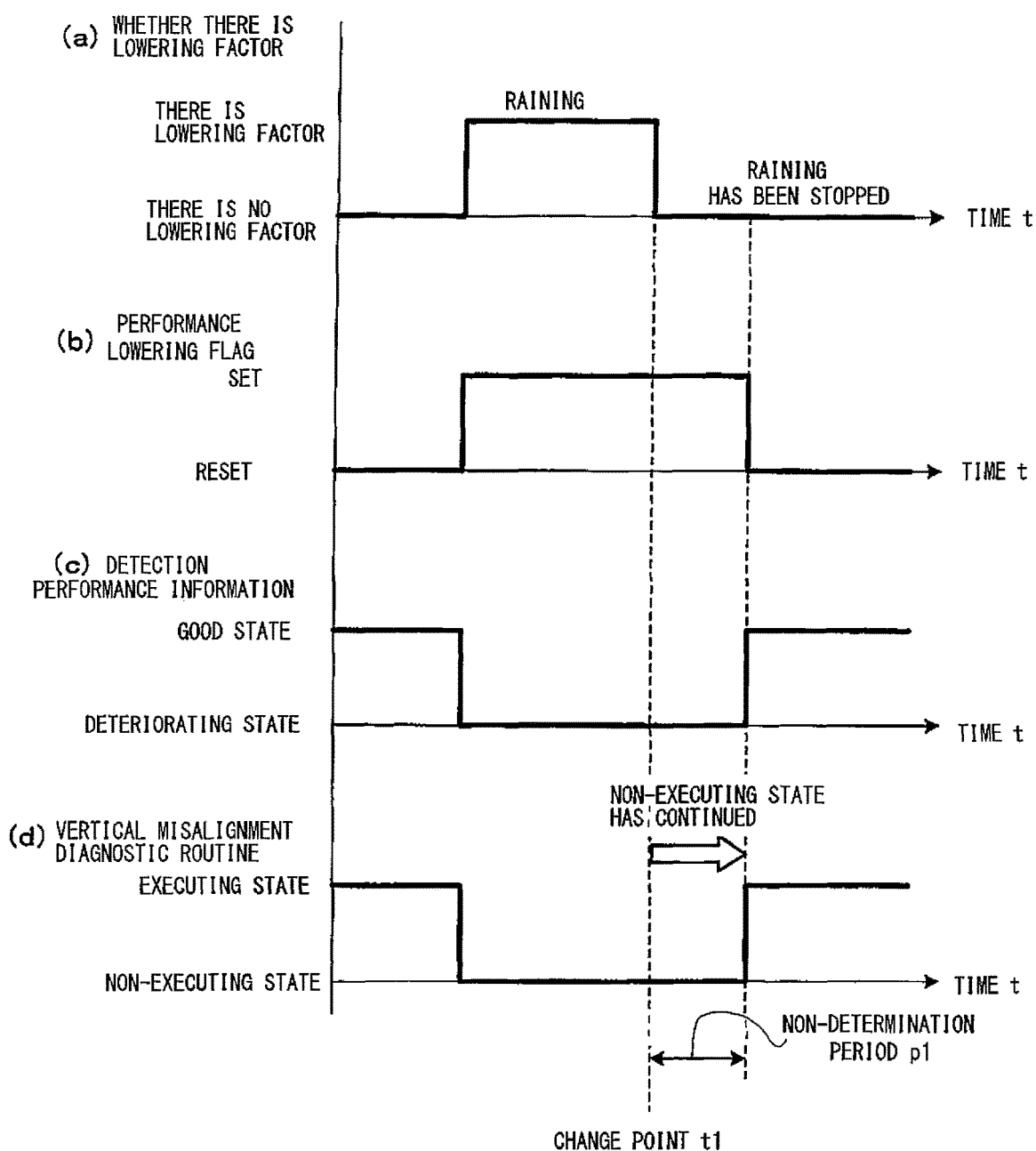
FIG. 17 is a timing chart illustrating operations of a target recognition device according to the fourth embodiment.

As illustrated in FIG. 17 as an example, in the radar misalignment diagnostic routine according to the fourth embodiment, raining has been stopped for the non-determination period p1 since the change point t 1 at which the rainy state changes to the rain stopped state (see (a) in FIG. 17). It is however determined that, during the non-determination period p1, there is a possibility that the detection performance of the radar sensor 11 has fallen due to the raining (NO in step S15). Thus, the operation in step S100 receives, as the detection performance information, information indicative of there being a possibility that the target detection performance of the radar sensor 11 has fallen. As a result, non-execution state, in which the vertical misalignment diagnostic routine is not executed, has continued for the non-determination period p1 (see NO in step S200 and (d) of FIG. 17).

4-3. Advantageous Effect

The fourth embodiment described in detail above achieves the following advantageous effects in addition to the first to fifth advantageous effects of the first embodiment.

For example, even if the state that no lowering factor is present changes to the state that the lowering factor to deteriorate the detection performance of the radar sensor 11 is present, there is a possibility that the detection performance of the radar sensor 11 does not change from the deteriorating state to the good state in response to the change. For example, let us assume that rain is considered as the lowering factor. In this assumption, even if the rainy state, which corresponds to the state that the lowering factor is present, changes to the rain stopped state, which corresponds to the state that no lowering factors are present, the detection performance of the radar sensor 11 becomes deteriorated when rain drops are adhered to the detection window of the radar sensor 11 after stop of the raining.

From this viewpoint, in the fourth embodiment, it has been determined for the non-determination period since the change point at which the rainy state changes to the rain stopped state (YES in step S200). This results in the non-execution state in which the vertical misalignment diagnostic routine is not executed having continued for the non-determination period. This configuration disables detection and correction of vertical misalignment from being executed. This reduces erroneous detection of vertical misalignment. Note that it is preferable that the non-determination period is set to be longer than the time required to dry rain drops adhered to the detection window of the radar sensor 11 after the stop of rain.

Note that the operation in step S10 by the CPU 31 or a hardware structure that carries out the operation in step S10 serves as, for example, a lower factor determining means. The operation in step S40 by the CPU 31 or a hardware structure that carries out the operation in step S40 serves as, for example, a setting means. The non-determination period corresponds to an example of a non-detection period.

5. Fifth Embodiment

5-1. Different Points from First Embodiment

The fundamental structure of the fifth embodiment is basically identical to that of the fourth embodiment except for the following different point. So, the following mainly describes the different point while omitting the descriptions of the common structure.

Figure 18:
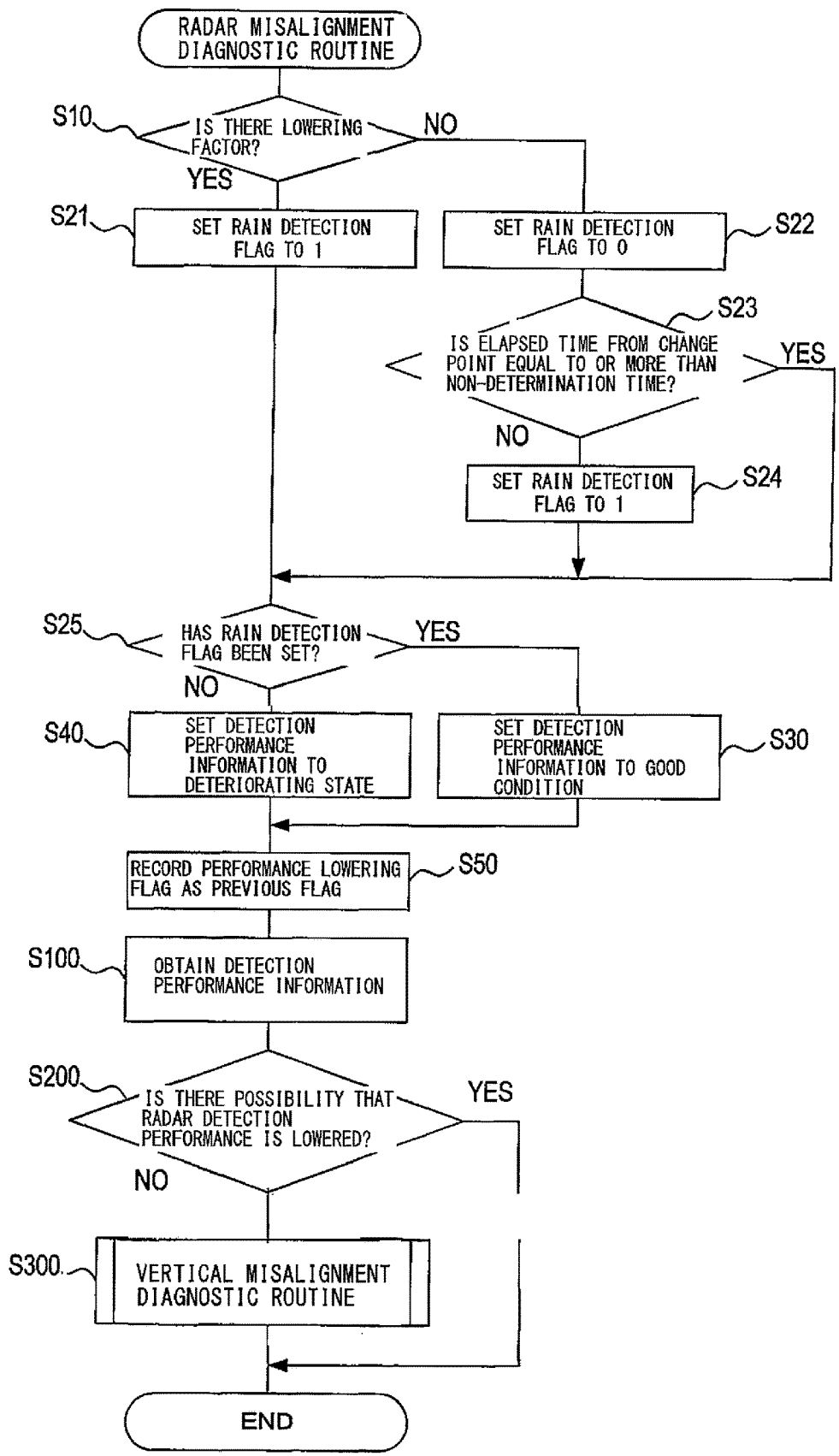
FIG. 18 is a flowchart schematically illustrating a misalignment diagnostic routine according to the fifth embodiment of the present invention.

Referring to FIG. 18, the fifth embodiment is different from the fourth embodiment in that the operations in steps S11 to S15 of the flowchart illustrated in FIG. 16 are replaced with steps S21 to S25, respectively.

First, the target recognition device 13 determines whether a lowering factor has occurred in step S10, which is identical to the operation in step S10 of FIG. 16. The target recognition device 13 executes the operation in step S21 when it is determined that a lowering factor has occurred, and executes the operation in step S22 when it is determined that there are no lowering factors.

Upon determining that a lowering factor has occurred, the target recognition device 13 sets a rain detection flag, which is one bit information having a logical low level expressed by 0 or a logical high level expressed by 1 in step S21. Specifically, in step S21, the target recognition device 13 sets the rain detection flag to 1. When the operation in step S21 is completed, the radar misalignment diagnostic routine proceeds to step S25.

Otherwise, upon determining that there are no lowering factors, the target recognition device 13 resets the rain detection flag in step S22. Specifically, in step S22, the target recognition device 13 sets the rain detection flag to 0.

Following the operation in step S22, the target recognition device 13 determines whether time, which has elapsed since a change point from a rainfall state to a no-rainfall state, is equal to or more than a predetermined non-determination period in step S23.

The target recognition device 13 carries out the operation in step S25 upon determining that the elapsed time since the change point from the rainfall state to the no-rainfall state is equal to or more than the non-determination period (YES in step S23). Otherwise, the target recognition device 13 carries out the operation in step S24 upon determining that the elapsed time since the change point from the rainfall state to the no-rainfall state is less than the non-determination period (NO in step S23).

Note that the change point from the rainfall state to the no-rainfall state represents timing at which the rainfall state changes to the state of the stop of rain. Like the fourth embodiment, the non-determination period is set to a predetermined time required to dry rain drops adhered to the detection window of the radar sensor 11 after the stop of rain.

Note that the target recognition device 13, i.e. its CPU 31, includes, for example, the change point determiner 13$f$, which is, for example, different from the radar misalignment diagnostic routine. The change point determiner 13$f$ determines the change point from the rainfall state to the no-rainfall state according to the rain detection flag. The change point determiner 13$f$ is configured to record the elapsed time since the change point in the RAM 33.

In step S24, the target recognition device 13 sets the rain detection flag that has been reset. Specifically, in step S24, the target recognition device 13 sets the rain detection flag to 1, thus updating the rain detection flag.

In step S25, the target recognition device 13 determines whether the rain detection flag that has been set. Specifically, the target recognition device 13 determines that the rain detection flag that has been set upon determining that the value of the rain detection flag is 1. The target recognition device 13 carries out the operation in step S30 upon determining that the rain detection flag that has been set, and carries out the operation in step S40 otherwise upon determining that the rain detection flag has not been set.

The target recognition device 13 performs the operations in steps S30, S40, S100, S200, and S300 in the similar procedure as those illustrated in FIG. 16.

Figure 19:
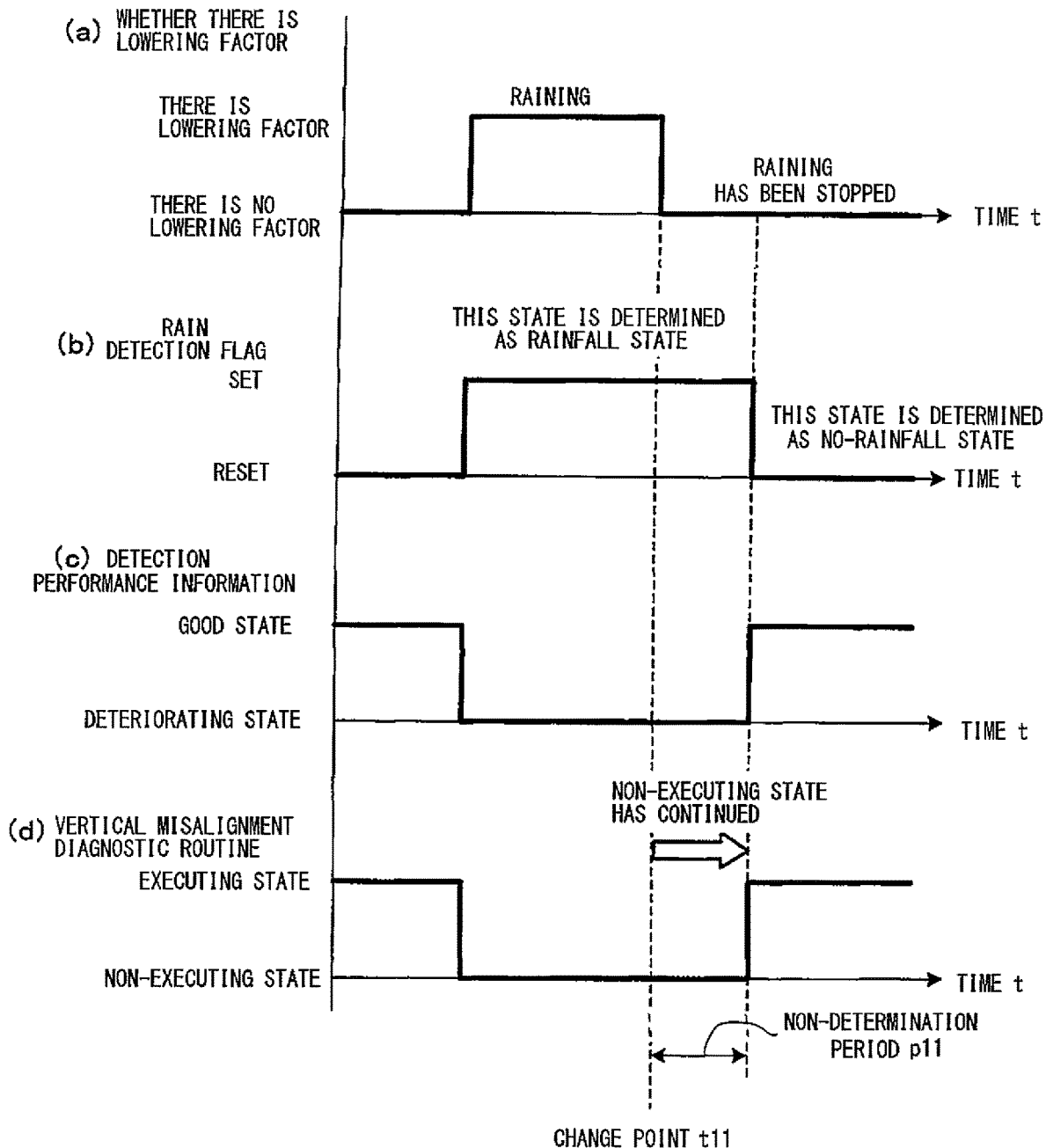
FIG. 19 is a timing chart illustrating operations of a target recognition device according to the fifth embodiment.

As illustrated in FIG. 19 as an example, in the radar misalignment diagnostic routine according to the fifth embodiment, raining has been stopped for the non-determination period p11 since the change point t 11 from the rainfall state to the no-rainfall state (see (a) in FIG. 19). It is however determined that there is a rainfall state during the non-determination period p11 (see (b) in FIG. 19). As a result, non-execution state, in which the vertical misalignment diagnostic routine is not executed, has continued for the non-determination period p11 (see NO in step S200 and (d) of FIG. 19).

5-3. Advantageous Effect

The fifth embodiment described in detail above achieves the advantageous effects that are identical to those according to the first embodiment.

Note that the operation in step S24 by the CPU 31 or a hardware structure that carries out the operation in step S24 serves as, for example, a change means.

6. Sixth Embodiment

6-1. Different Points from First Embodiment

The fundamental structure of the sixth embodiment is basically identical to that of the first embodiment except for the following different point. So, the following mainly describes the different point while omitting the descriptions of the common structure.

Figures 20, 21:
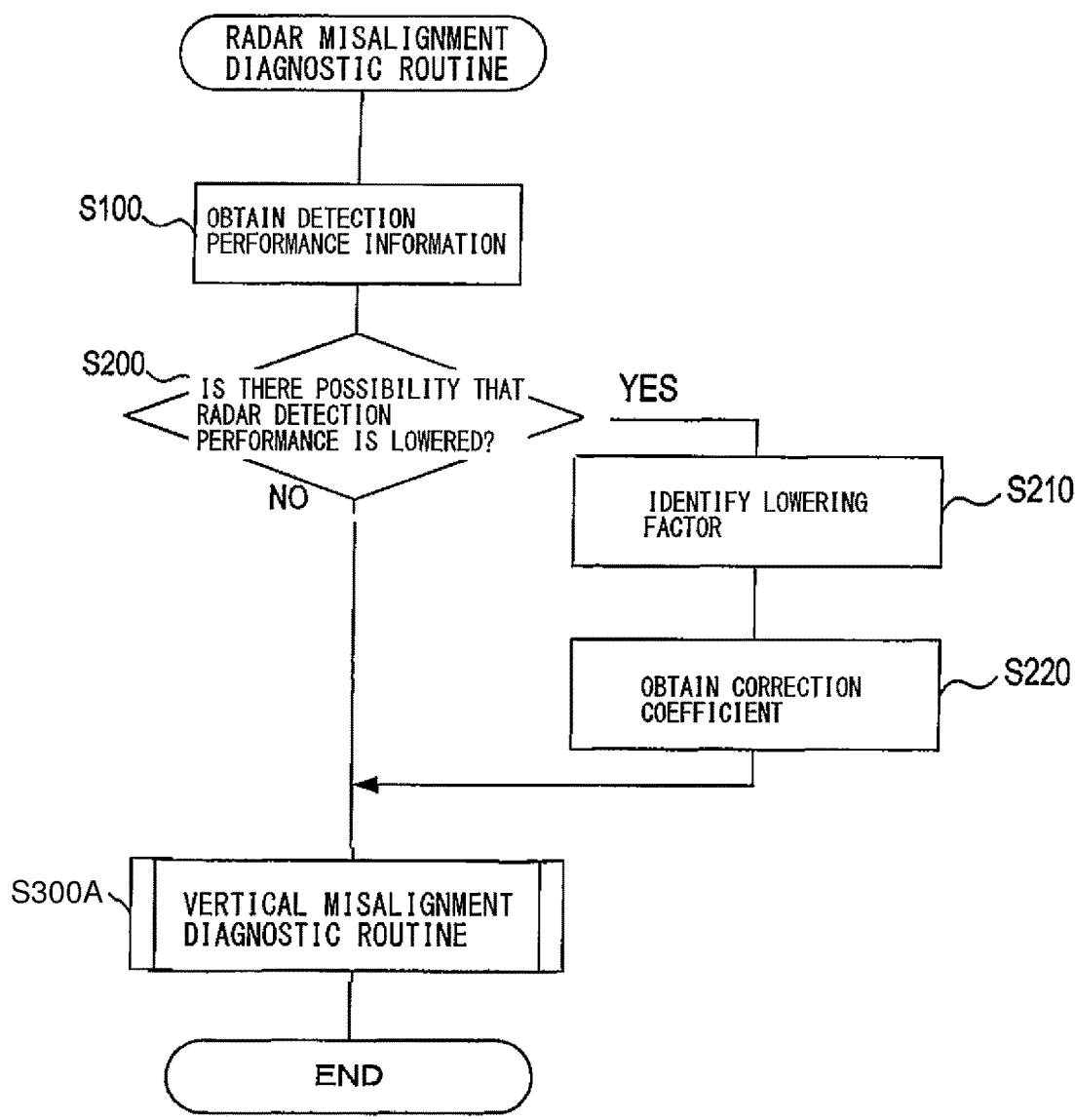
FIG. 20 is a flowchart schematically illustrating a misalignment diagnostic routine according to the sixth embodiment of the present invention.
FIG. 21 is a diagram illustrating an example of a table, which is prepared for the target recognition device, representing the relationship between a correction coefficient and factors associated with the reduction in the detection performance.

Referring to FIG. 20, the sixth embodiment is different from the first embodiment in that the operations in steps S210 to S220 for obtaining a correction coefficient for correcting the vertical misalignment quantity are added before the radar misalignment diagnostic routine in step S300.

6-2. Routine

The following describes the radar misalignment diagnostic routine according to the sixth embodiment with reference to the flowchart of FIG. 20.

The target recognition device 13 performs the operations in steps S100, S200, and S300 in the similar procedure as those illustrated in FIG. 6.

Upon determining that there is a possibility that the target detection performance of the radar sensor 11 is lower than predetermined detection performance (YES in step S200), the target recognition device 13 performs the operation in step S210.

In step S210, the target recognition device 13 identifies a lowering factor that may cause reduction of the detection performance. For example, the target recognition device 13 determines rain as the lowering factor of the detection performance upon detecting that the wiper device is operating, according to at least one of (1) The operating signal sent from the wiper device
(2) Images captured by the image sensor 12
(3) Detection signals, which are sent from various sensors installed in the vehicle 1 (see phantom line in FIG. 1), indicative of the operating conditions, i.e. travelling conditions, of the vehicle 1.

In subsequent step S220, the target recognition device 13 obtains, based on the identified detection-performance lowering factor, the correction coefficient for correcting the misalignment quantity obtained in step S300A. Then, the target recognition device 13 performs the operation in step S300A.

Specifically, in step S300A according to the sixth embodiment, the target recognition device 13 multiplies the vertical misalignment quantity calculated by the vertical misalignment-quantity calculation routine in step S1040 of FIG. 7 by the correction coefficient obtained in step S210, thus correcting the vertical misalignment quantity. Thereafter, the target recognition device 13 terminates the radar misalignment diagnostic routine.

Values of the correction coefficient are stored, as a table format illustrated in FIG. 21, in the ROM 32 as an example. A value P of the correction coefficient is set in the table for the cases where the detection-performance lowering factor is not rain, and a value Q, which is different from the value P, of the correction coefficient is set in the table for the remaining cases where the detection-performance lowering factor is rain. The value Q of the correction coefficient for the cases where the detection-performance lowering factor is rain is set to be smaller than the value P of the correction coefficient for the cases where the detection-performance lowering fact is not rain.

In step S220, the target recognition device 13 reads out the value Q of the correction coefficient from the table stored in the ROM 32 upon (1) Determining that the detection performance information representing that there is a possibility that the detection performance of the radar sensor 11 has fallen in step S100
(2) Identifying that the detection-performance lowering factor is rain in step S210.

The readout value Q of the correction coefficient corresponds to the information indicative of the detection-performance lowering factor being rain. That is, the value Q of the correction coefficient is smaller than the value P of the correction coefficient; the value P of the correction coefficient corresponds to the detection-performance lowering factor being rain.

6-3. Advantageous Effect

The sixth embodiment described in detail above achieves the following advantageous effects in addition to the first to fifth advantageous effects of the first embodiment.

When specifically identifying a detection-performance lowering factor if there is a possibility that the detection performance of the radar sensor 11 has fallen, the target recognition device 13 corrects the obtained vertical misalignment quantity, based on the identified detection-performance lowering factor and the correction coefficient whose values are previously obtained by, for example, experiment.

For example, the sixth embodiment assumes that the quantity of decrease in the detection performance due to raining is larger than the quantity of decrease in the detection performance due to another factor. In this assumption, the vertical misalignment quantity obtained by the vertical misalignment diagnostic routine according to the first embodiment under the condition of the detection performance being lowered due to raining is estimated to be larger than the vertical misalignment quantity obtained by the vertical misalignment diagnostic routine according to the first embodiment under the condition of the detection performance being lowered due to another factor except for raining.

From this viewpoint, the target recognition device 13 according to the sixth embodiment calculates the vertical misalignment quantity under the detection-performance lowering state due to rain being lower than the vertical misalignment quantity under the detection-performance lowering state due to another factor except for raining (see step S300A).

Specifically, the target recognition device 13 corrects the obtained vertical misalignment quantity to thereby eliminate, from the obtained vertical misalignment quantity, an error component due to the detection-performance lowering state.

The above-configured target recognition device 13 performs the vertical misalignment diagnostic routine (see step S300A) upon determining that there is a possibility that the detection performance of the radar sensor 11 has fallen. This obtains a proper vertical misalignment quantity, i.e. a vertical misalignment quantity depending on the detection-performance lowering factor.

Note that the target recognition device 13 corresponds to an example of a diagnostic means, an information obtaining means, and a correcting means. In addition, the operation in step S100 by the CPU 31 or a hardware structure corresponding to the operation in step S100 serves as an example of the information obtaining means. The operations in step S200 and step S1040 included in the operation in step S300A by the CPU 31 or a hardware structure corresponding to the operations in steps S200 and S1040 serves as an example of the correcting means.

7. Various Modifications

The first to sixth embodiments of the present invention have been described, but the present invention is not limited to the first to sixth embodiments, and can be naturally modified as various modifications.

The target recognition device 13 of each embodiment is configured to detect a vertical misalignment quantity of the radar sensor 11 in the vertical direction in the vertical misalignment diagnostic routine, but can be configured to detect only information about whether there is vertical misalignment in the vertical direction.

Each embodiment defines vertical misalignment based on the angle between the center axis M of the detection range of the radar sensor 11 and the vertical direction, i.e. the Y-axis direction.

However, other definitions can be made.

For example, the vertical misalignment can be defined based on the angle between the center axis M of the detection range of the radar sensor 11 and the horizontal direction, i.e. the X-axis direction, in the vertical direction.

In addition, an axis of the radar sensor 11 for defining axial misalignment can be different from the center axis M. For example, an axis, which extends from the radar sensor 11 as the starting point, toward the probing range of targets can be established, and vertical misalignment can be defined based on the established axis.

The vertical misalignment diagnostic routine described in the third embodiment can be applied to the vertical misalignment diagnostic routine, which is carried out by the target recognition device 13 in step S300 according to the second embodiment. The counter reset operation carried out in a case where there is a possibility that the detection performance of the radar sensor 11 has fallen resets all the counters illustrated in the flowchart of FIG. 14, i.e. the fourth to ninth counters C4 to C9.

The target recognition device 13 according to each of the first to third embodiments outputs the detection performance information indicative of there being a possibility that the detection performance of the radar sensor 11 has fallen, but the present invention is not limited to the configuration.

For example, the target recognition device 13 can detect, based on various approaches, that there is a possibility that the detection performance of the radar sensor 11 has fallen, and output the corresponding detection performance information.

For example, in step S200, the target recognition device 13 can determine whether the wiper device is operating, by at least one of the wiper device itself, the image sensor 12, and the various sensors set forth above. Then, the target recognition device 13 can determine that a weather factor has occurred; the weather factor lowers the detection performance of the radar sensor 11, such as the occurring of rain or snow. Then, the target recognition device 13 can output detection performance information representing that there is a possibility that the detection performance of the radar sensor 11 has fallen.

In addition, in step S200, the target recognition device 13 can determine whether the driver of the own vehicle 1 has operated the wiper device. The target recognition device 13 can determine that a weather factor, which lowers the detection performance of the radar sensor 11, such as rain or snow, has occurred. Then, the target recognition device 13 can output detection performance information representing that there is a possibility that the detection performance of the radar sensor 11 has fallen.

The non-determination period according to each of the fourth to sixth embodiments is determined based on a corresponding lowering factor of the detection performance of the radar sensor 11.

The non-determination period according to each of the fourth to sixth embodiments is for example set to a predetermined time required to dry rain drops adhered to the detection window of the radar sensor 11 after the stop of rain that is the lowering factor. The present invention is however not limited to this example.

The non-determination period can be set to a predetermined time required to dry snow adhered to the detection window of the radar sensor 11 after the stop of snow if the lowering factor is snow. The non-determination period for snow as the lowering factor is set to be preferably longer than the non-determination period for rain as the lowering factor.

The non-determination period according to each of the fourth to sixth embodiments is set based on the lowering factor of the detection performance of the radar sensor 11, but the present invention is not limited thereto. For example, the non-determination period according to each of the fourth to sixth embodiments is set based on the speed of the vehicle 1 that is installed with the target recognition device 13.

Figure 22:
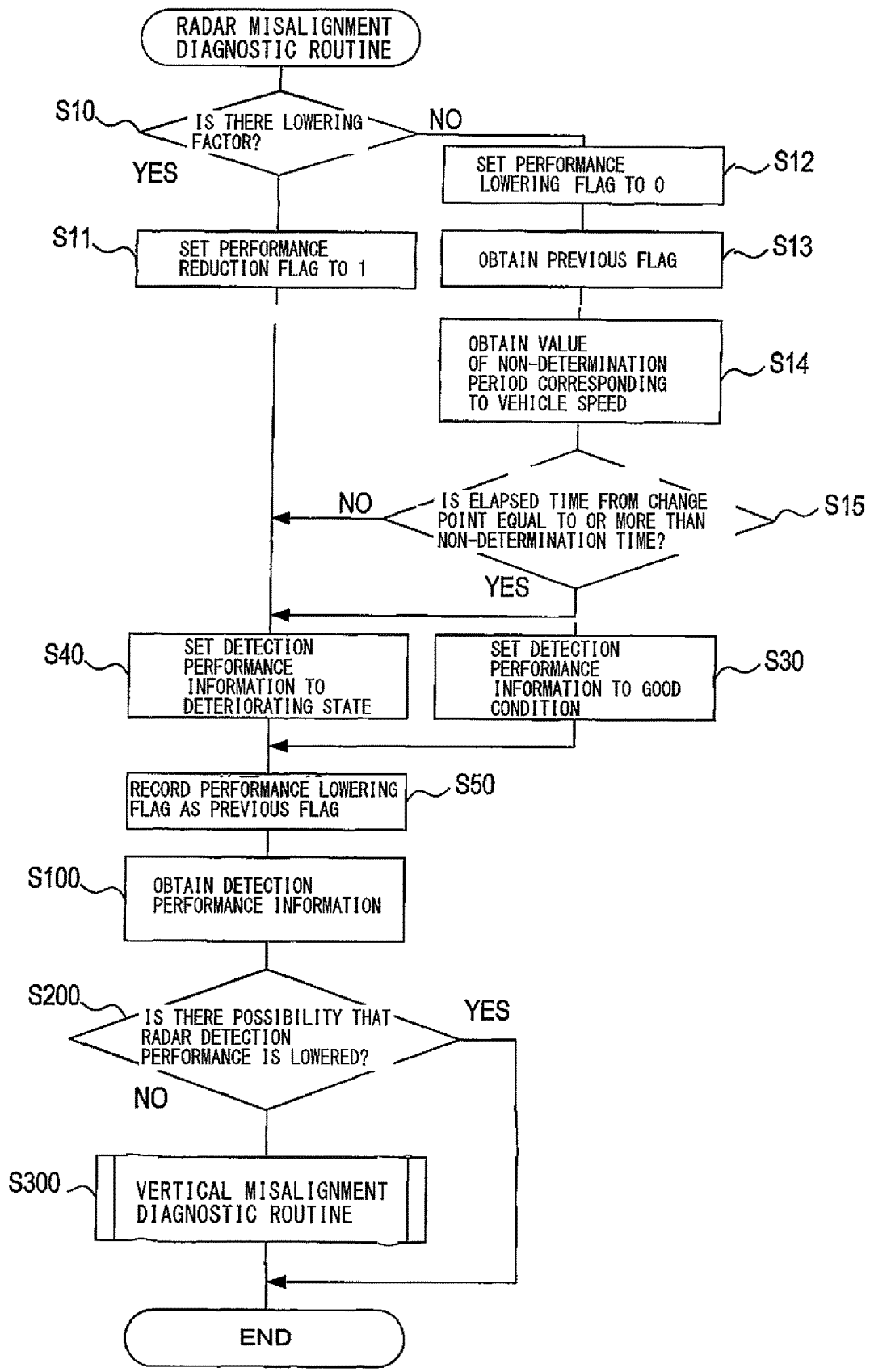
FIG. 22 is a timing chart for describing operations of a target recognition device according to another embodiment of the present invention.

FIG. 22 illustrates a modification of the radar misalignment diagnostic routine of the fourth embodiment illustrated in FIG. 16.

As illustrated in step S14 of FIG. 22, the target recognition device 13, i.e. its CPU 13, obtains the speed of the vehicle 1 from one of the sensors illustrated in FIG. 1 before executing the operation in step S15. In step S14, the target recognition device 13 obtains, from a table previously stored in the ROM 32, a value of the non-determination period corresponding to the obtained speed of the vehicle 1; the table represents the relationship between the speed of the vehicle 1 and the non-determination period. Note that, in the table, a value of the non-determination period for the lower speed of the vehicle 1 than a predetermined threshold speed is preferably set to be longer than another value of the non-determination period for the case where the speed of the vehicle 1 is higher than the predetermined threshold speed.

The functions of one element in each embodiment can be distributed as plural elements, and the functions that plural elements have can be combined into one element. At least part of the structure of each embodiment can be replaced with a known structure having the same function as the at least part of the structure of the corresponding embodiment.

A part of the structure of each embodiment can be eliminated as long as the remaining structure of the corresponding embodiment is capable of solving the problem. At least part of the structure of each embodiment can be added to or replaced with the structures of the other embodiments. All aspects included in the technological ideas specified by the language employed by the claims constitute embodiments of the present invention.

The present invention can be implemented by various embodiments in addition to the drive assist 10 and the target recognition device 13; the various modification include programs for running the target recognition device 13, storage media storing the programs, and axial misalignment diagnostic methods.

| 1  | Own vehicle               | 10 | Drive assist system |
|----|---------------------------|----|---------------------|
| 11 | Radar sensor              | 12 | Image sensor        |
| 13 | Target recognition device |    |                     |
| 14 | Drive assist execution device |    |                 |
| 31 | CPU                       |    |                     |

The invention claimed is:

1. A diagnostic apparatus of a beam sensor installed in a vehicle, the beam sensor transmitting a probing beam and receiving a reflected beam based on the probing beam to detect a target, the diagnostic apparatus comprising:
   a diagnostic means for diagnosing whether there is vertical misalignment of the probing beam in a vertical direction, the vertical direction corresponding to a height direction of the vehicle; and
   a determining means configured, based on detection performance information indicating a possibility that detection performance of a target by the beam sensor is lower than a predetermined detection performance, to:
      cause the diagnostic means to execute diagnosis of whether there is vertical misalignment upon the detection performance information representing that there is no possibility that the detection performance of the target by the beam sensor is lower than the predetermined detection performance; and
      disable the diagnostic means from executing diagnosis of whether there is vertical misalignment upon the detection performance information representing that there is a possibility that the detection performance of the target by the beam sensor is lower than the predetermined detection performance,
   wherein the detection performance information is determined based on an input indicating weather.

2. The diagnostic apparatus according to claim 1, wherein:
   the diagnostic means is configured to detect a vertical misalignment quantity of the probing beam in response to the diagnostic means diagnosing that there is vertical misalignment of the probing beam.

3. The diagnostic apparatus according to claim 1, further comprising:
   a beam recognition means configured to repeatedly execute a first target recognition task in front of the vehicle based on a result of receiving the reflected beam of the beam sensor; and
   an image recognition means configured to repeatedly execute a second target recognition task based on a captured image in front of the vehicle captured by an image sensor,
   wherein the diagnostic means comprises:
      a misalignment detection means configured to:
         calculate, based on a result of the first target recognition task by the beam recognition means and a result of the second target recognition task by the image recognition means, a relationship between a number of times at least one preceding vehicle is recognized by the first and second target recognition tasks and the number of times the at least one preceding vehicle is recognized by at least one of the first and second target recognition tasks; and
         detect, based on the relationship, a misalignment quantity of an axis of the probing beam of the beam sensor in a vertical plane including the axis of the probing beam as a vertical misalignment quantity.

4. The diagnostic apparatus according to claim 3, wherein:
   the beam recognition means comprises a beam recognition counter that counts the number of times the at least one preceding vehicle is recognized by the first target recognition task; and
   the image recognition means comprises an image recognition counter that counts the number of times the at least one preceding vehicle is recognized by the second target recognition task,
   the diagnostic apparatus further comprising:
   a reset means for resetting a counted value of each of the beam recognition counter and the image recognition counter upon it being determined by the determining means that there is a possibility that the detection performance of the target by the beam sensor is lower than the predetermined detection performance.

5. The diagnostic apparatus according to claim 3, further comprising a distance recognition means for recognizing a value of a distance between the vehicle and the at least one preceding vehicle based on one of the result of each of the first target recognition task and the result of each of the second target recognition task,
   wherein the diagnostic means is configured to:
      calculate a value of the relationship for each recognized value of the distance; and
      detect the misalignment quantity of the axis for each recognized value of the distance based on the value of the relationship for the corresponding recognized value of the distance.

6. The diagnostic apparatus according to claim 1, further comprising:
   a lowering factor determining means for determining whether there is a lowering factor that lowers the detection performance of the target by the beam sensor; and
   a setting means for setting the detection performance information to a detection condition, based on a determination result by the lowering factor determining means.

7. The diagnostic apparatus according to claim 6, wherein, based on the determination result representing that there are no lowering factors, the setting means is configured to set the detection performance information to the detection condition upon:
   an elapsed time being lower than a predetermined non-detection period,
   the elapsed time being time that has elapsed since a change point, the change point representing a point at which the determination result is changed from there being a lowering factor to there being no lowering factors.

8. The diagnostic apparatus according to claim 7, wherein:

the predetermined non-detection period is set based on the lowering factor.

9. The diagnostic apparatus according to claim 7, wherein:
the predetermined non-detection period is set based on a speed of the vehicle in which the diagnostic apparatus is installed.

10. The diagnostic apparatus according to claim 6, further comprising:
a changing means is configured to, based on the determination result representing that there are no lowering factors, change the determination result, via the lowering factor determining means, to a different determination result that comprises a lowering factor upon:
an elapsed time being lower than a predetermined non-detection period,
the elapsed time being time that has elapsed since a change point, the change point representing a point at which the determination result is changed from there being a lowering factor to there being no lowering factors.

11. The diagnostic apparatus according to claim 1, wherein the input indicating weather indicates rain or snow.

12. The diagnostic apparatus according to claim 1, wherein the input indicating weather is based on a determination of whether a vehicle wiper device is operating.

13. A diagnostic apparatus of a beam sensor installed in a vehicle, the beam sensor transmitting a probing beam and receiving a reflected beam based on the probing beam to detect a target, the diagnostic apparatus comprising:
a diagnostic means for:
diagnosing whether there is vertical misalignment of the probing beam in a vertical direction, the vertical direction corresponding to a height direction of the vehicle; and
obtaining a quantity of the vertical misalignment in response to the diagnosing means diagnosing that there is the vertical misalignment;
an obtaining means for obtaining detection performance information indicating a possibility that detection performance of a target by the beam sensor is lower than a predetermined detection performance, the detection performance information being determined based on an input indicating weather; and
a correcting means for correcting the quantity of the vertical misalignment obtained by the diagnostic means such that:
a value of the quantity of the vertical misalignment, when the detection performance information representing that there is a possibility that the detection performance of the target by the beam sensor being lower than the predetermined detection performance, is less than a value of the quantity of the vertical misalignment when the detection performance information represents that there is no possibility that the detection performance of the target by the beam sensor is lower than the predetermined detection performance.

14. The diagnostic apparatus according to claim 13, wherein the input indicating weather indicates rain or snow.

* * * * *